United States Patent
Wu et al.

(10) Patent No.: US 12,026,332 B2
(45) Date of Patent: Jul. 2, 2024

(54) DETECTION METHOD, DISPLAY PANEL, DRIVER CHIP AND DISPLAY DEVICE

(71) Applicant: Xiamen Tianma Micro-Electronics Co., Ltd., Xiamen (CN)

(72) Inventors: Changzhi Wu, Xiamen (CN); Ying Sun, Xiamen (CN); Yumin Xu, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 0 days.

(21) Appl. No.: 17/753,637

(22) PCT Filed: May 19, 2021

(86) PCT No.: PCT/CN2021/094560
§ 371 (c)(1),
(2) Date: Sep. 29, 2022

(87) PCT Pub. No.: WO2022/198774
PCT Pub. Date: Sep. 29, 2022

(65) Prior Publication Data
US 2024/0045530 A1    Feb. 8, 2024

(30) Foreign Application Priority Data
Mar. 22, 2021  (CN) .......................... 202110304023.1

(51) Int. Cl.
*G06F 3/041*    (2006.01)
(52) U.S. Cl.
CPC ........ *G06F 3/0412* (2013.01); *G06F 3/04164* (2019.05)

(58) Field of Classification Search
None
See application file for complete search history.

(56) References Cited

U.S. PATENT DOCUMENTS

2018/0182333 A1*  6/2018  Ahn ..................... G09G 3/3655

FOREIGN PATENT DOCUMENTS

| CN | 106771817 A | 5/2017 |
| CN | 108242223 A | 7/2018 |

* cited by examiner

*Primary Examiner* — Brian M Butcher
(74) *Attorney, Agent, or Firm* — KILPATRICK TOWNSEND & STOCKTON LLP

(57) ABSTRACT

The display panel includes at least one first touch area group and multiple touch wires; the at least one first touch area group includes two rows and N columns of touch electrodes; and each touch wire is electrically connected to a respective one touch electrode. The display panel further includes a first detection circuit and a second detection circuit; and each touch electrode is separately electrically connected to the first detection circuit and the second detection circuit by a respective one touch wire. The touch short-circuit detection stage includes a first detection stage. The detection method includes providing, at the first detection stage, a short-circuit detection signal for a touch electrode in the first touch electrode row by the first detection circuit; and determining, according to a short-circuit feedback signal generated by the second detection circuit, whether adjacent ones of the touch electrodes located in a same column are short-circuited.

18 Claims, 9 Drawing Sheets

DETECTION METHOD, DISPLAY PANEL, DRIVER CHIP AND DISPLAY DEVICE

This application is a U.S. National Stage Application of PCT Application Serial No. PCT/CN2021/094560, filed May 19, 2021, which claims priority to a Chinese patent application No. 202110304023.1 filed with the CNIPA on Mar. 22, 2021, disclosures of which are incorporated herein by reference in their entireties.

FIELD

The present disclosure relates to the field of display technologies, for example, to a detection method, a display panel, a driver chip and a display device.

BACKGROUND

Display panels with a touch control function are widely used in display devices such as mobile phones and wearable devices, the display devices can achieve man-machine interaction in a simple and convenient way. Typically, the display panel with the touch control function is provided with multiple touch electrodes, and the corresponding touch operation is achieved by detecting the signal variation amount of the multiple touch electrodes.

However, metal residues between the touch electrodes will inevitably occur when the touch electrodes in the display panel are prepared, to further affect the subsequent touch detection. Therefore, how to implement the accurate test of the touch electrodes becomes an urgent problem to be solved.

SUMMARY

The present application provides a detection method, a display panel, a driver chip, and a display device to detect touch electrodes in the display panel.

Provided is a detection method. A display panel includes at least one first touch area group and multiple touch wires; the at least one first touch area group includes two rows and N columns of touch electrodes; and each touch wire of the multiple touch wires is electrically connected to a respective one touch electrode of the two rows and N columns of touch electrodes, where N≥1 and N is a positive integer.

The display panel further includes a first detection circuit and a second detection circuit; and each touch electrode of the two rows and N columns of touch electrodes is separately electrically connected to the first detection circuit and the second detection circuit by a respective one of touch wires.

The two rows and N columns of touch electrodes include a first touch electrode row and a second touch electrode row, where the first touch electrode row is adjacent to the second touch electrode row.

The display panel includes a touch short-circuit detection stage; where the touch short-circuit detection stage includes a first detection stage.

The detection method includes the steps described below.

At the first detection stage, a short-circuit detection signal is provided for the touch electrode in the first touch electrode row by the first detection circuit.

It is determined whether adjacent touch electrodes located in a same column are short-circuited according to a short-circuit feedback signal generated by the second detection circuit.

Further provided is a display panel. The display panel includes a driver chip, at least one first touch area group and multiple touch wires; the at least one first touch area group includes two rows and N columns of touch electrodes; and each touch wire of the multiple touch wires is electrically connected to a respective one touch electrode of the two rows and N columns of touch electrodes, where N≥1, and N is a positive integer.

The display panel further includes a first detection circuit and a second detection circuit; and each touch electrode of the two rows and N columns of touch electrodes is separately electrically connected to the first detection circuit and the second detection circuit by a respective one of touch wires.

The two rows and N columns of touch electrodes includes a first touch electrode row and a second touch electrode row, where the first touch electrode row is adjacent to the second touch electrode row.

The display panel includes a touch short-circuit detection stage; where the touch short-circuit detection stage includes a first detection stage.

The driver chip is configured to provide, at the first detection stage, the short-circuit detection signal for a touch electrode in the first touch electrode row by the first detection circuit, and determine, according to a short-circuit feedback signal generated by the second detection circuit, whether adjacent ones of the touch electrodes located in the same column are short-circuited.

Further provided is a driver chip for executing the preceding detection method.

Further provided is a display device, including the preceding display panel.

DETAILED DESCRIPTION

Figure 1:
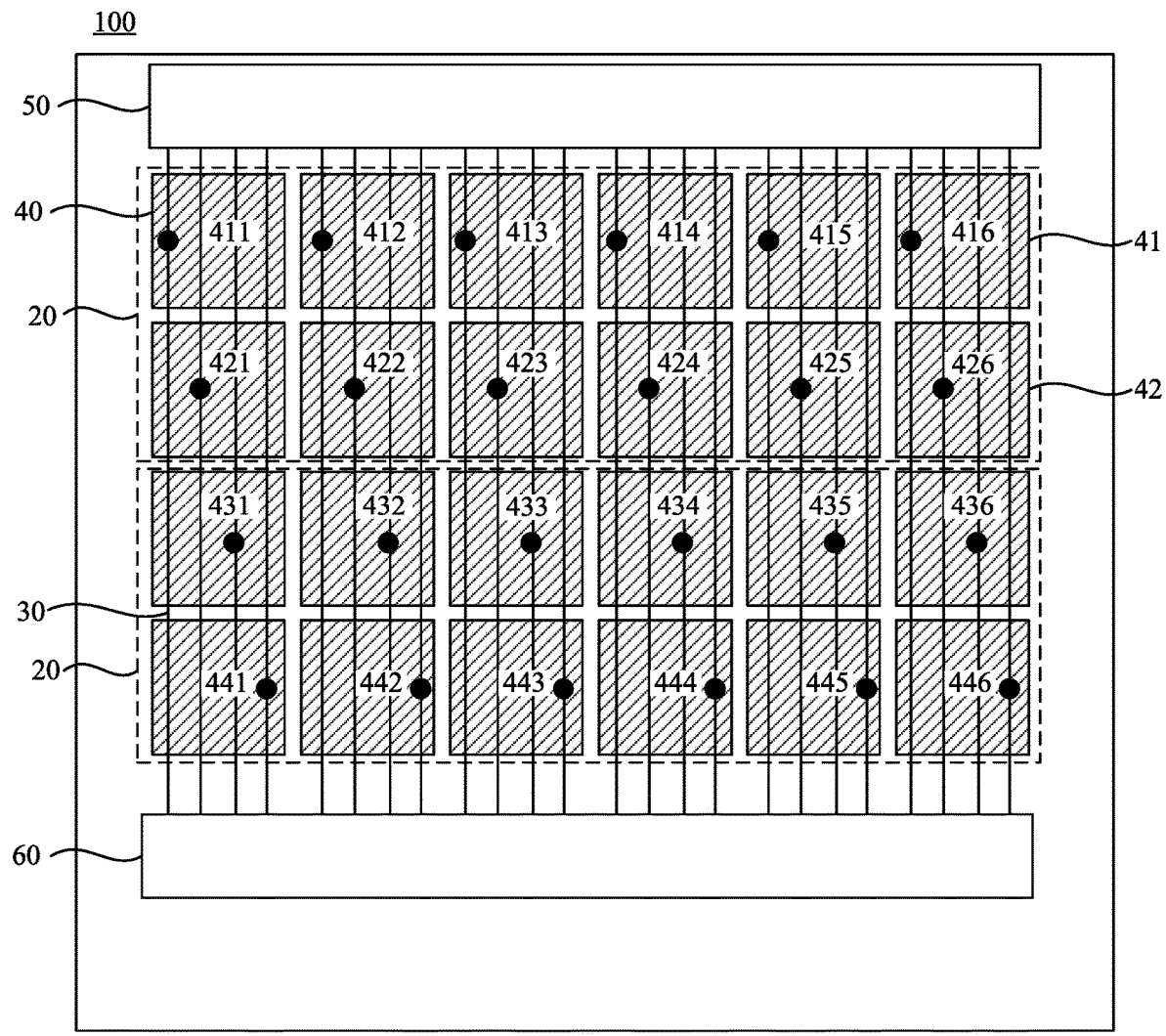
FIG. 1 is a structure view of a display panel provided by an embodiment of the present application.

The present application is described below in conjunction with drawings and embodiments. The embodiments described herein are merely intended to explain the present application and not to limit the present application. For ease of description, only part, not all, of structures related to the present application are illustrated in the drawings.

To solve the preceding problems, an embodiment of the present application provides a detection method. A display panel includes: at least one first touch area group and multiple touch wires. The at least one first touch area group includes two rows and N columns of touch electrodes; and each touch wire of touch wires is electrically connected to a respective one touch electrode of the two rows and N columns of touch electrodes, where N≥1 and N is a positive integer. The display panel further includes a first detection circuit and a second detection circuit; and each touch electrode of the two rows and N columns of touch electrodes is separately electrically connected to the first detection circuit and the second detection circuit by a respective one touch wire. The two rows and N columns of touch electrodes include a first touch electrode row and a second touch electrode row, where the first touch electrode row is adjacent to the second touch electrode row. The display panel includes a touch short-circuit detection stage, where the touch short-circuit detection stage includes a first detection stage. The detection method includes: at the first detection stage, a short-circuit detection signal is provided for the touch electrode in the first touch electrode row by the first detection circuit; and according to a short-circuit feedback signal generated by the second detection circuit, whether adjacent ones of the touch electrodes located in the same column are short-circuited is determined.

According to the preceding solution, the short-circuit detection signal is provided for the touch electrode in the first touch electrode row by the first detection circuit, and whether the adjacent touch electrodes located in the same column are short-circuited is determined according to the signal fed back to the second detection circuit by the adjacent touch electrode located in the same column, the problem that the subsequent touch detection is affected because the metal residues between the touch electrodes occur when the touch electrodes in the display panel are prepared is solved, to achieve the accurate test of the touch electrodes.

FIG. 1 is a structure view of a display panel provided by an embodiment of the present application. As shown in FIG. 1, a display panel 100 provided by the embodiment of the present application includes at least one first touch area group 20 and multiple touch wires 30; the at least one first touch area group 20 includes two rows and N columns of touch electrodes 40, where N≥1 and N is a positive integer. The two rows and N columns of touch electrodes 40 include a first touch electrode row 41 and a second touch electrode row 42, where the first touch electrode row 41 is adjacent to the second touch electrode row 42. Each touch wire 30 of the multiple touch wires 30 is electrically connected to a respective one touch electrode 40 of the two rows and N columns of touch electrodes 40. In FIG. 1, the case where the display panel 100 includes two first touch area groups 20 and each first touch area group 20 includes two rows and six columns of touch electrodes 40 is used as an example for description, which does not constitute a limitation to the present application. The display panel 100 may include one first touch area group 20, two first touch area groups 20, or more first touch area groups 20, and each first touch area group 20 may include two rows and one column of touch electrodes 40, two rows and two columns of touch electrodes 40, or two rows and more columns of touch electrodes 40. The case where the display panel 100 includes two first touch area groups 20 and each first touch area group 20 includes two rows and six columns of touch electrodes 40 in the embodiment described below is used as an example for description. Repetition will not be made here.

Referring to FIG. 1, the display panel 100 further includes a first detection circuit 50 and a second detection circuit 60. Each touch electrode 40 is electrically connected to the first detection circuit 50 and the second detection circuit 60 by the respective touch wire 30 separately. That is, one terminal of the touch wire 30 connected to the touch electrode 40 is electrically connected to the first detection circuit 50 and the other terminal of the touch wire 30 connected to the touch electrode 40 is electrically connected to the second detection circuit 60. The display panel 100 includes a touch short-circuit detection stage. The touch short-circuit detection stage includes a first detection stage.

Figure 2:
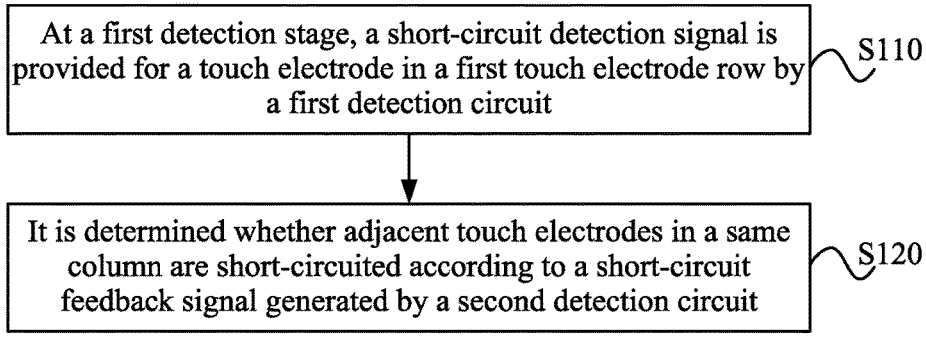
FIG. 2 is a flowchart of a detection method provided by an embodiment of the present application.

FIG. 2 is a flowchart of a detection method provided by an embodiment of the present application. As shown in FIG. 2, the detection method provided by the embodiment of the present application includes the steps described below.

In step S110, at the first detection stage, a short-circuit detection signal is provided for the touch electrode 40 in the first touch electrode row 41 by the first detection circuit 50.

Exemplarily, referring to FIG. 1, the display panel 100 includes four rows of touch electrodes 40 arranged in an array, touch electrodes (411, 412, 413, 414, 415 and 416) in a first row and touch electrodes (421, 422, 423, 424, 425 and 426) in a second row constitute one first touch area group 20, and touch electrodes (431, 432, 433, 434, 435 and 436) in a third row and touch electrodes (441, 442, 443, 444, 445 and 446) in a fourth row constitute one first touch area group 20. The touch electrodes (411, 412, 413, 414, 415 and 416) in the first row and the touch electrodes (431, 432, 433, 434, 435 and 436) in the third row are both the first touch electrode row 41; and the touch electrodes (421, 422, 423, 424, 425 and 426) in the second row and the touch electrodes (441, 442, 443, 444, 445 and 446) in the fourth row are both the second touch electrode row 42. At the first detection stage, the short-circuit detection signal is provided for the touch electrodes (411, 412, 413, 414, 415 and 416) in the first row and the touch electrode (431, 432, 433, 434, 435 and 436) in the third row by the first detection circuit 50.

In step S120, whether adjacent touch electrodes 40 located in the same column are short-circuited is determined according to a short-circuit feedback signal generated by the second detection circuit 60.

Referring to FIG. 1, if the touch electrode 411 and the touch electrode 421 are short-circuited, the short-circuit detection signal received by the touch electrode 411 is transmitted to the touch electrode 421, and then output to the second detection circuit 60 by the touch wire 30 electrically connected to the touch electrode 421. If the touch electrode 431 and the touch electrode 421 are short-circuited, the short-circuit detection signal received by the touch electrode 431 is also transmitted to the touch electrode 421, and then output to the second detection circuit 60 by the touch wire 30 electrically connected to the touch electrode 421. Based on this, the second detection circuit 60 feeds back one signal, i.e., the short-circuit feedback signal. According to the short-circuit feedback signal, it can be determined whether the touch electrode 411 and the touch electrode 421 are short-circuited; or the touch electrode 431 and the touch electrode 421 are short-circuited; or the touch electrode 411 and the touch electrode 421 are short-circuited and the touch electrode 431 and the touch electrode 421 are short-circuited.

If the touch electrode 441 and the touch electrode 431 are short-circuited, the short-circuit detection signal received by the touch electrode 431 is transmitted to the touch electrode 441, and then output to the second detection circuit 60 by the touch wire 30 electrically connected to the touch electrode

441. Based on this, the second detection circuit 60 feeds back one short-circuit feedback signal, and according to the short-circuit feedback signal, it can be determined whether the touch electrode 441 and the touch electrode 431 are short-circuited.

The preceding examples are illustrated by taking whether the touch electrodes 40 in a first column are short-circuited as an example, and such method is also applicable to the touch electrodes in other columns.

In this way, in a case where the short-circuit detection signal is supplied to one touch electrode in the first touch electrode row 41, according to the signal fed back to the second detection circuit by a touch electrode 40 adjacent to the one touch electrode 40 and in the same column as the touch electrode 40, whether the touch electrodes 40 in the same column are short-circuited can be detected.

Figure 3:
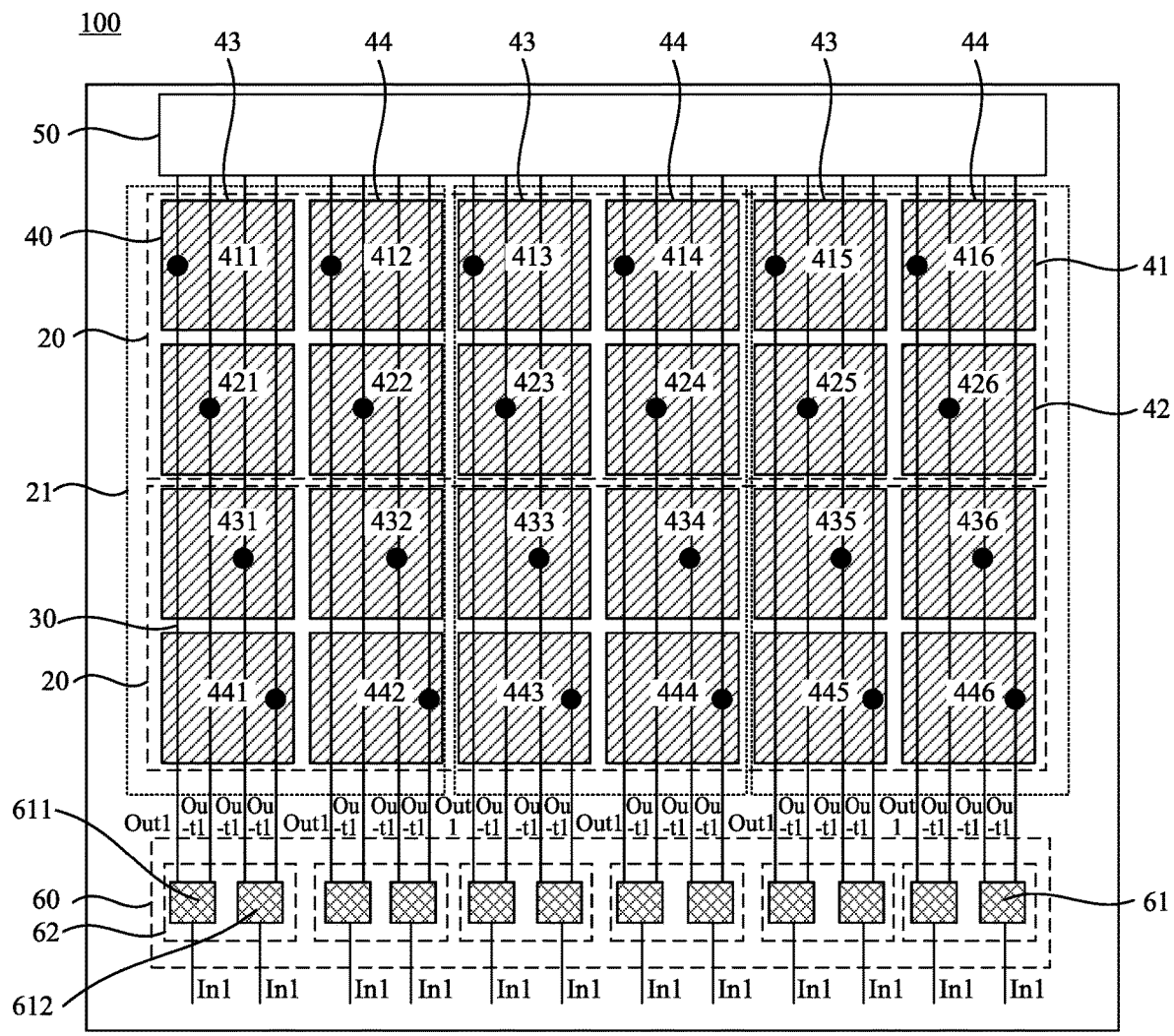
FIG. 3 is a structure view of another display panel provided by an embodiment of the present application.

In one embodiment, FIG. 3 is a structure view of another display panel provided by an embodiment of the present application. As shown in FIG. 3, the second detection circuit 60 includes multiple multiplex selection devices 61. Each multiplex selection device 61 includes a first input terminal in1 and a number M of first output terminals out1, where M≥2 and M is a positive integer. The number M of first output terminals out1 of the each multiplex selection device 61 are in one-to-one correspondence with and electrically connected to a number M of adjacent ones of the touch electrodes 40 located in the same column by a number M of touch wires 30. Exemplarily, referring to FIG. 3, the second detection circuit 60 includes six multiplex selection device groups 62. The six multiplex selection device groups 62 are in one-to-one correspondence with six touch electrode columns, that is, one multiplex selection device group 62 corresponds to a respective one touch electrode column. Each multiplex selection device group 62 includes two multiplex selection devices 61. The two multiplex selection devices 61 are a first multiplex selection device 611 and a second multiplex selection device 612. Two first output terminals out1 of the first multiplex selection device 611 in the multiplex selection device group 62 corresponding to a first touch electrode column are electrically connected to the touch electrode 411 and the touch electrode 421 respectively by the touch wires 30. Two first output terminals out1 of the second multiplex selection device 612 in the multiplex selection device group 62 corresponding to the first touch electrode column are electrically connected to the touch electrode 431 and the touch electrode 441 respectively by the touch wires 30. The multiplex selection device groups 62 corresponding to other touch electrode columns are electrically connected to the touch electrodes 40 in the other touch electrode columns in the same connection manner. Since in FIG. 3, the case where the touch electrode array includes four rows and six columns of touch electrodes 40 is used as an example for description, each multiplex selection device group 62 includes two multiplex selection devices 61. In a case where the touch electrode array includes L rows and six columns of touch electrodes 40, each multiplex selection device group 62 includes a number L/2 of multiplex selection devices 61, which sequentially are a first multiplex selection device 611, a second multiplex selection device 612, a second multiplex selection device, . . . , and an L/2-th multiplex selection device. Further, in FIG. 3, the multiplex selection device 61 includes the first input terminal in1 and two first output terminals out1, and the two first output terminals out1 are electrically connected to two adjacent touch electrodes 40 located in the same column, respectively. If the multiplex selection device 61 includes the first input terminal in1 and three, four or a number N of first output terminals out1, the three, four or the number N of first output terminals out1 are electrically connected to three, four or a number N of adjacent ones of the touch electrodes 40 located in the same column.

The detection method provided by the embodiment of the present application further includes the steps described below. At the first detection stage, the short-circuit detection signal is provided for the touch electrodes 40 in the first touch electrode row 41 by the first detection circuit 50; and according to the short-circuit feedback signal generated by the first detection circuit 50, whether adjacent ones of the touch electrodes 40 located in the same column are short-circuited is determined.

Exemplarily, referring to FIG. 3, if the touch electrode 411 and the touch electrode 421 are short-circuited, the short-circuit detection signal received by the touch electrode 411 is transmitted to the touch electrode 421, and then output, by the touch wire 30 electrically connected to the touch electrode 421, to the multiplex selection device 61 electrically connected to the touch wire 30. If the touch electrode 431 and the touch electrode 421 are short-circuited, the short-circuit detection signal received by the touch electrode 431 is also transmitted to the touch electrode 421, and then output, by the touch wire 30 electrically connected to the touch electrode 421, to the multiplex selection device 61 electrically connected to the touch wire 30.

The multiplex selection device 61 feeds back one signal, i.e., the short-circuit feedback signal, by the first input terminal in1. According to the fed-back short-circuit feedback signal, it can be determined whether the touch electrode 411 and the touch electrode 421 are short-circuited; or the touch electrode 431 and touch electrode 421 are short-circuited, or the touch electrode 411 and touch electrode 421 are short-circuited and the touch electrode 431 and touch electrode 421 are short-circuited. In addition, the short-circuit detection signal may be output, by the touch wire 30 electrically connected to the touch electrode 421, to the first detection circuit 50 electrically connected to the touch wire 30, and based on this, the first detection circuit 50 feeds back one signal, i.e., the short-circuit feedback signal. According to the short-circuit feedback signal, it can be determined whether the touch electrode 411 and the touch electrode 421 are short-circuited; or the touch electrode 431 and the touch electrode 421 are short-circuited; or the touch electrode 411 and the touch electrode 421 are short-circuited and the touch electrode 431 and the touch electrode 421 are short-circuited. That is, in this embodiment, the short-circuit detection signal may be provided for the touch electrode 40 in the first touch electrode row 41 by the first detection circuit 50, and then it is determined whether adjacent ones of the touch electrodes 40 located in the same column are short-circuited according to the short-circuit feedback signal fed back by the second detection circuit 60. In one embodiment, the short-circuit detection signal may also be provided for the touch electrode 40 in the first touch electrode row 41 by the first detection circuit 50, and then it is determined whether adjacent ones of the touch electrodes 40 in the same column are short-circuited according to the short-circuit feedback signal fed back by the first detection circuit 50. In this way, the short-circuit detection between adjacent ones of the touch electrodes 40 in the same column becomes flexible, and is not limited to be detected by the second detection circuit 60.

In the preceding examples, only the case where the touch electrode 411 and touch electrode 421 are short-circuited; or the touch electrode 431 and the touch electrode 421 are short-circuited; or the touch electrode 411 and the touch electrode 421 are short-circuited and the touch electrode 431 and the touch electrode 421 are short-circuited is used as an example for description, and the other adjacent ones of the touch electrodes 40 in the same column are also applicable to this method.

In the preceding examples, the touch electrodes (411, 412, 413, 414, 415 and 416) in the first row and the touch electrodes (431, 432, 433, 434, 435 and 436) in the third row are both the first touch electrode rows 41, and the touch electrodes (421, 422, 423, 424, 425 and 426) in the second row and the touch electrodes (441, 442, 443, 444, 445 and 446) in the fourth row are both the second touch electrode rows 42, that is, the first touch electrode row 41 is located in an odd row, and the second touch electrode row 42 is located in an even row. In other embodiments, it may also be that the first touch electrode row 41 is located in an even row and the second touch electrode row 42 is located in an odd row.

In one embodiment, referring to FIGS. 1 and 3, the multiple touch electrodes 40 are arranged in an array, and the first detection circuit 50 and the second detection circuit 60 are located on two opposite sides of the touch electrode array, respectively. Such arrangement has the advantages of facilitating the wiring, simplifying the structure of the display panel, and improving the preparation efficiency of the display panel.

On the basis of the preceding solutions, in some embodiments, referring to FIG. 3, the display panel 100 further includes at least one second touch area group 21; and each second touch area group 21 includes two columns and L rows of touch electrodes 40, where L≥2 and L is a positive integer. In FIG. 3, the case where the display panel 100 includes three second touch area groups 21 and each second touch area group 21 includes two columns and four rows of touch electrodes 40 is used as an example for description. However, this example does not constitute a limitation to the present application, that is, the display panel 100 may include one second touch area group 21, two second touch area groups 21, or more second touch area groups 21, and each second touch area group 21 may include two rows and two columns of touch electrodes 40 or two rows and more columns of touch electrodes 40.

Referring to FIG. 3, the two columns and L rows of touch electrodes 40 include a first touch electrode column 43 and a second touch electrode column 44. The first touch electrode column 43 is adjacent to the second touch electrode column 44. The touch short-circuit detection stage further includes a second detection stage. The second detection stage may be before the first detection stage or may be after the first detection stage.

The detection method further includes the steps described below. At the second detection stage, the short-circuit detection signal is provided for the touch electrode 40 in the first touch electrode column 43 by the multiplex selection device 61 corresponding to the first touch electrode column 43; and according to the short-circuit feedback signal generated by the multiplex selection device 61 corresponding to the second touch electrode column 44, it is determined whether the touch electrodes 40 in the same row are short-circuited.

Exemplarily, referring to FIG. 3, it can be seen from the preceding embodiments, the six multiplex selection device groups 62 are in one-to-one correspondence with six touch electrode columns, that is, one multiplex selection device group 62 corresponds to one touch electrode column. Each multiplex selection device group 62 includes two multiplex selection devices 61. The two multiplex selection devices 61 are the first multiplex selection device 611 and the second multiplex selection device 612.

The second detection stage may include, for example, a first detection sub-stage and a second detection sub-stage. At the first detection sub-stage, the short-circuit detection signal is provided for the touch electrode 40 in the first touch electrode column 43 and in the first touch electrode row 41 by the multiplex selection device 61 in the multiplex selection device group 62 corresponding to the first touch electrode column 43, for example, the first multiplex selection device 611 provides the short-circuit detection signal for the touch electrode 411 and the second multiplex selection device 612 provides the short-circuit detection signal for the touch electrode 431. If the touch electrode 411 and the touch electrode 412 are short-circuited, the short-circuit detection signal received by the touch electrode 411 is transmitted to the touch electrode 412, and then output to the first multiplex selection device 611 corresponding to the second touch electrode column 44 by the touch wire 30 electrically connected to the touch electrode 412. If the touch electrode 413 and the touch electrode 412 are short-circuited, the short-circuit detection signal received by the touch electrode 413 is also transmitted to the touch electrode 412, and then output to the first multiplex selection device 611 corresponding to the second touch electrode column 44 by the touch wire 30 electrically connected to the touch electrode 412. Based on this, the first multiplex selection device 611 feeds back one signal, i.e., the short-circuit feedback signal. According to the short-circuit feedback signal, it can be determined whether the touch electrode 411 and the touch electrode 412 are short-circuited; or whether the touch electrode 413 and touch electrode 412 are short-circuited; or whether the touch electrode 411 and the touch electrode 412 are short-circuited as well as whether the touch electrode 413 and touch electrode 412 are short-circuited. Similarly, if the touch electrode 431 and the touch electrode 432 are short-circuited, the short-circuit detection signal received by the touch electrode 431 is transmitted to the touch electrode 432, and then output to the second multiplex selection device 612 corresponding to the second touch electrode column 44 by the touch wire 30 electrically connected to the touch electrode 432. If the touch electrode 433 and the touch electrode 432 are short-circuited, the short-circuit detection signal received by the touch electrode 433 is also transmitted to the touch electrode 432, and then output to the second multiplex selection device 612 corresponding to the second touch electrode column 44 by the touch wire 30 electrically connected to the touch electrode 432. Based on this, the second multiplex selection device 612 feeds back one signal, i.e., the short-circuit feedback signal. According to the short-circuit feedback signal, it can be determined whether the touch electrode 431 and the touch electrode 432 are short-circuited; or whether the touch electrode 433 and touch electrode 432 are short-circuited; or whether the touch electrode 431 and the touch electrode 432 are short-circuited, and whether the touch electrode 433 and touch electrode 432 are short-circuited. That is, the short-circuit detection signal is provided for the touch electrode in the first touch electrode column 43 and in the first touch electrode row 41, and if the signal is received by the multiplex selection device 61 corresponding to the touch electrode 40 in the second touch electrode column 44 and in the first touch electrode row 41, it can be determined that the touch electrode 40 in the second touch electrode column 44 and in the first touch electrode row 41 is short-circuited with the touch electrode 40 adjacent to the touch electrode 40 in the second touch electrode column 44 and in the first touch electrode row 41.

At the second detection sub-stage, the short-circuit detection signal is provided for the touch electrode 40 in the first touch electrode column 43 and in the second touch electrode row 42 by the multiplex selection device 61 in the multiplex selection device group 62 corresponding to the first touch electrode column 43. For example, the first multiplex selection device 611 provides the short-circuit detection signal for the touch electrode 421 and the second multiplex selection device 612 provides the short-circuit detection signal for the touch electrode 441. If the touch electrode 421 and the touch electrode 422 are short-circuited, the short-circuit detection signal received by the touch electrode 421 is transmitted to the touch electrode 422, and then output to the first multiplex selection device 611 corresponding to the second touch electrode column 44 by the touch wire 30 electrically connected to the touch electrode 422. If the touch electrode 423 and the touch electrode 422 are short-circuited, the short-circuit detection signal received by the touch electrode 423 is also transmitted to the touch electrode 422, and then output to the first multiplex selection device 611 corresponding to the second touch electrode column 44 by the touch wire 30 electrically connected to the touch electrode 422. Based on this, the first multiplex selection device 611 feeds back one signal, i.e., the short-circuit feedback signal. According to the short-circuit feedback signal, it can be determined whether the touch electrode 421 and the touch electrode 422 are short-circuited; or whether the touch electrode 423 and touch electrode 422 are short-circuited; or whether the touch electrode 421 and the touch electrode 422 are short-circuited and whether the touch electrode 423 and touch electrode 422 are short-circuited. Similarly, if the touch electrode 441 and the touch electrode 442 are short-circuited, the short-circuit detection signal received by the touch electrode 441 is transmitted to the touch electrode 442, and then output to the second multiplex selection device 612 corresponding to the second touch electrode column 44 by the touch wire 30 electrically connected to the touch electrode 442. If the touch electrode 443 and the touch electrode 442 are short-circuited, the short-circuit detection signal received by the touch electrode 443 is also transmitted to the touch electrode 442, and then output to the second multiplex selection device 612 corresponding to the second touch electrode column 44 by the touch wire 30 electrically connected to the touch electrode 442. Based on this, the second multiplex selection device 612 feeds back one signal, i.e., the short-circuit feedback signal.

According to the short-circuit feedback signal, it can be determined whether the touch electrode 441 and the touch electrode 442 are short-circuited; or whether the touch electrode 443 and touch electrode 442 are short-circuited; or whether the touch electrode 441 and the touch electrode 442 are short-circuited and whether the touch electrode 443 and touch electrode 442 are short-circuited. That is, the short-circuit detection signal is provided for the touch electrode in the first touch electrode column 43 and in the second touch electrode row 42, and if the signal is received by the multiplex selection device 61 corresponding to the touch electrode 40 in the second touch electrode column 44 and in the second touch electrode row 42, it can be determined that the touch electrode 40 in the second touch electrode column 44 and in the second touch electrode row 42 is short-circuited with the touch electrode 40 adjacent to the touch electrode 40 in the second touch electrode column 44 and in the second touch electrode row 42.

In the preceding examples, only the case where whether adjacent touch electrodes 40 in the same row in one second touch area group 21 are short-circuited is used as an example for description. The detection method is also applicable to the detection of whether adjacent touch electrodes 40 in the same row in other second touch area group 21 are short-circuited.

In the preceding examples, the touch electrodes (411, 421, 431 and 441) in the first column, the touch electrodes (413, 423, 433 and 443) in the third column, and the touch electrodes (415, 425, 435 and 445) in the fifth column are all the first touch electrode columns 43. The touch electrodes (412, 422, 432 and 442) in the second column, the touch electrodes (414, 424, 434 and 444) in the fourth column, and the touch electrodes (416, 426, 436 and 446) in the sixth column are all the second touch electrode columns 44. That is, the first touch electrode column 43 is located in an odd column, and the second touch electrode column 44 is located in an even column. In other embodiments, it may also be that the first touch electrode column 43 is located in the even column and the second touch electrode column 44 is located in the odd column.

Figure 4:
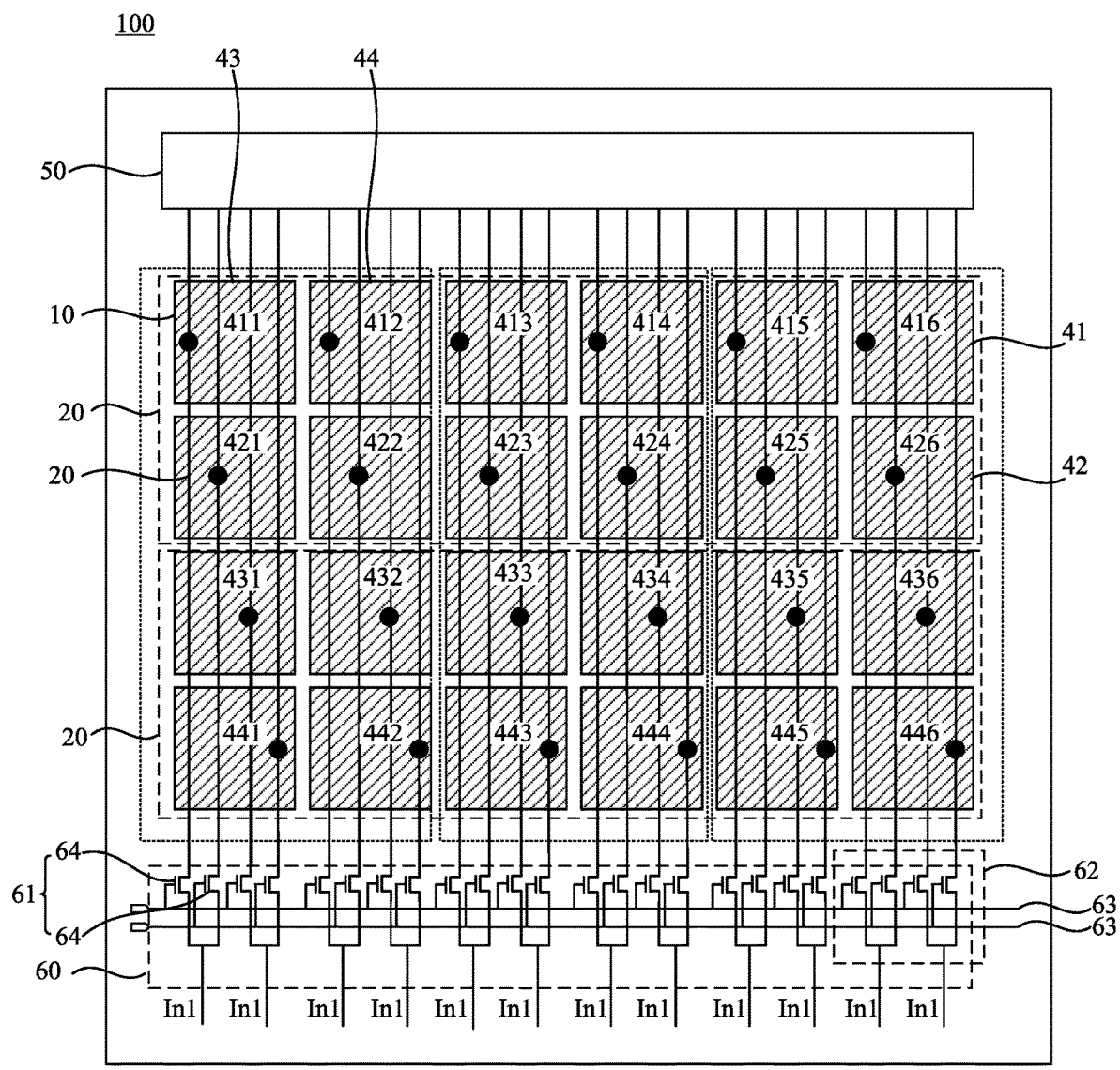
FIG. 4 is a structure view of another display panel provided by an embodiment of the present application.

On the basis of the preceding solutions, in some embodiments, FIG. 4 is a structure view of another display panel provided by an embodiment of the present application. As shown in FIG. 4, the second detection circuit 60 includes a number M of first control lines 63. Each multiplex selection device 61 includes a number M of first switching devices 64. Control terminals of the first switching devices 64 having the same arrangement number in different multiplex selection devices 61 are electrically connected to the same first control line. First terminals of the number M of first switching devices 64 in the same multiplex selection device 61 are electrically connected, and the first terminals of the number M of first switching devices 64 in the same multiplex selection device 61 are electrically connected to the first input terminal in1. Second terminals of the number M of first switching devices 64 in the same multiplex selection device 61 are in one-to-one correspondence with and electrically connected to the number M of adjacent ones of the touch electrodes 40 in the same column.

The second detection stage includes a first detection sub-stage, . . . , and an M-th detection sub-stage, where $1 \leq i \leq M$ and i is a positive integer.

The step in which at the second detection stage, the short-circuit detection signal is provided for the touch electrode 40 in the first touch electrode column 43 by the multiplex selection device 61 corresponding to the first touch electrode column 43; and according to the short-circuit feedback signal generated by the multiplex selection device 61 corresponding to the second touch electrode column 44, it is determined whether the touch electrodes 40 in the same row are short-circuited includes the steps described below.

At the i-th detection sub-stage, a first enable signal is transmitted to a first control line 63 in an i-th line to provide the short-circuit detection signals to the touch electrodes 40 in the first touch electrode column 43 by first switching devices 64 having an arrangement number of i, and according to the short-circuit feedback signal generated by the first switching device 64 having the arrangement number of i corresponding to the second touch electrode column 44, it is determined whether the touch electrodes 40 in a n×i-th row are short-circuited, where n is 1, 2, . . . , Z/M, n is a positive integer, and Z is a total number of rows of the touch electrodes.

The step in which at the first detection stage, the short-circuit detection signal is provided for the touch electrode 40 in the first touch electrode row 41 by the first detection circuit 50, and according to the short-circuit feedback signal generated by the second detection circuit 60, it is determined whether adjacent ones of the touch electrodes 40 in the same column are short-circuited includes the steps described below.

At the first detection stage, the short-circuit detection signal is provided for a first touch electrode by the first detection circuit 50, and according to the short-circuit feedback signal generated by the first switching device electrically connected to a second touch electrode, it is determined whether adjacent ones of the touch electrodes 40 in the same column are short-circuited. The first touch electrode and the second touch electrode are located in the same first touch area group 20 and in the same touch electrode column.

Exemplarily, referring to FIG. 4, the second detection circuit 60 includes two first control lines 63. The multiplex selection device 61 includes two first switching units 64. Control terminals of the first switching devices 64 having the same arrangement number of one in different multiplex selection devices 61 are electrically connected to the same first control line 63. Control terminals of the first switching devices 64 having the same arrangement number of two in different multiplex selection devices 61 are electrically connected to the same first control line 63. The second detection stage includes a first detection sub-stage and a second detection sub-stage. At the first detection sub-stage, the first enable signal is transmitted to a first control line 63 in a first line, and the first switching devices 64 having the arrangement number of one are turned on. The short-circuit detection signals inputted by the first input terminals in1 corresponding to the first touch electrode columns 43 are provided for the touch electrodes 411, 413, 415, 431, 433 and 435 which are located in the first touch electrode columns 43 and in the first touch electrode rows 41 by the first switching devices 64 having the arrangement number of one. If the touch electrode 411 and the touch electrode 412 are short-circuited, the short-circuit detection signal received by the touch electrode 411 is transmitted to the touch electrode 412, and then output, by the touch wire 30 electrically connected to the touch electrode 412, to the first switching device 64 electrically connected to the touch wire 30, located in the second touch electrode column 44 and having the arrangement number of one. If the touch electrode 413 and the touch electrode 412 are short-circuited, the short-circuit detection signal received by the touch electrode 413 is transmitted to the touch electrode 412, and then, by the touch wire 30 electrically connected to the touch electrode 412, output to the first switching device 64 electrically connected to the touch wire 30, located in the second touch electrode column 44 and having the arrangement number of one. Since the first switching device 64 is turned on, the short-circuit detection signal (the short-circuit feedback signal) is outputted by the first switching device 64, and according to the short-circuit feedback signal, it can be determined whether the touch electrode 411 and the touch electrode 412 are short-circuited; or whether the touch electrode 413 and the touch electrode 412 are short-circuited; or whether the touch electrode 411 and the touch electrode 412 are short-circuited and whether the touch electrode 413 and the touch electrode 412 are short-circuited. Similarly, if the touch electrode 431 and the touch electrode 432 are short-circuited, the short-circuit detection signal received by the touch electrode 431 is transmitted to the touch electrode 432, and output, by the touch wire 30 electrically connected to the touch electrode 432, to the first switching device 64 electrically connected to the touch wire 30, located in the second touch electrode column 44 and having the arrangement number of one. If the touch electrode 433 and the touch electrode 432 are short-circuited, the short-circuit detection signal received by the touch electrode 433 is transmitted to the touch electrode 432, and then, by the touch wire 30 electrically connected to the touch electrode 432, output to the first switching device 64 electrically connected to the touch wire 30, located in the second touch electrode column 44 and having the arrangement number of one. Since the first switching device 64 is turned on, the short-circuit detection signal (the short-circuit feedback signal) is outputted by the first switching device 64, and according to the short-circuit feedback signal, it can be determined whether the touch electrode 431 and the touch electrode 432 are short-circuited; or whether the touch electrode 433 and the touch electrode 432 are short-circuited; or whether the touch electrode 431 and the touch electrode 432 are short-circuited and whether the touch electrode 433 and the touch electrode 432 are short-circuited.

At the second detection sub-stage, the first enable signal is transmitted to a first control line 63 in a second line, and the first switching devices 64 having the arrangement number of two are turned on. The short-circuit detection signals inputted by the first input terminals in1 corresponding to the first touch electrode columns 43 are provided for the touch electrodes 421, 423, 425, 441, 443 and 445 which are located in the first touch electrode columns 43 and in the second touch electrode rows 42 by the first switching devices 64 having the arrangement number of two. If the touch electrode 421 and the touch electrode 422 are short-circuited, the short-circuit detection signal received by the touch electrode 421 is transmitted to the touch electrode 422, and then output, by the touch wire 30 electrically connected to the touch electrode 422, to the first switching device 64 electrically connected to the touch wire 30, located in the second touch electrode column 44 and having the arrangement number of two. If the touch electrode 423 and the touch electrode 422 are short-circuited, the short-circuit detection signal received by the touch electrode 423 is transmitted to the touch electrode 422, and then output, by the touch wire 30 electrically connected to the touch electrode 422, to the first switching device 64 electrically connected to the touch wire 30, located in the second touch electrode column 44 and having the arrangement number of two. Since the first switching device 64 is turned on, the short-circuit detection signal (the short-circuit feedback signal) is outputted by the first switching device 64, and according to the short-circuit feedback signal, it can be determined whether the touch electrode 421 and the touch electrode 422 are short-circuited; or whether the touch electrode 423 and the touch electrode 422 are short-circuited; or whether the touch electrode 421 and the touch electrode 422 are short-circuited and whether the touch electrode 423 and the touch electrode 422 are short-circuited. Similarly, if the touch electrode 441 and the touch electrode 442 are short-circuited, the short-circuit detection signal received by the touch electrode 441 is transmitted to the touch electrode 442, and then output, by the touch wire 30 electrically connected to the touch electrode 442, to the first switching device 64 electrically connected to the touch wire 30, located in the second touch electrode column 44 and having the arrangement number of two. If the touch electrode 443 and the touch electrode 442 are short-circuited, the short-circuit detection signal received by the touch electrode 443 is transmitted to the touch electrode 442, and then output, by the touch wire 30 electrically connected to the touch electrode 442, to the first switching device 64 electrically connected to the touch wire 30, located in the second touch electrode column 44 and having the arrangement number of two. Since the first switching device 64 is turned on, the short-circuit detection signal (the short-circuit feedback signal) is outputted by the first switching device 64, and according to the short-circuit feedback signal, it can be determined whether the touch electrode 441 and the touch electrode 442 are short-circuited; or whether the touch electrode 443 and the touch electrode 442 are short-circuited; or whether the touch electrode 441 and the touch electrode 442 are short-circuited and whether the touch electrode 443 and the touch electrode 442 are short-circuited.

In the preceding examples, only the case where whether adjacent touch electrodes 40 in the same row in one second touch area group 21 are short-circuited is used as an example for description. The detection method is also applicable to the detection of whether adjacent touch electrodes 40 in the same row in other second touch area group 21 are short-circuited.

In summary, not only whether the adjacent touch electrodes in the same column are short-circuited, but also whether the adjacent touch electrodes in the same row are short-circuited can be detected by the preceding detection method, to achieve the overall and accurate detection of the touch electrodes, and solving the problem that the subsequent touch detection is affected because the metal residues between the touch electrodes occur when the touch electrodes in the display panel are prepared.

In the preceding embodiments, the structure of the second detection circuit 60 is described, and the structure of the first detection circuit 50 is described below.

Figure 5:
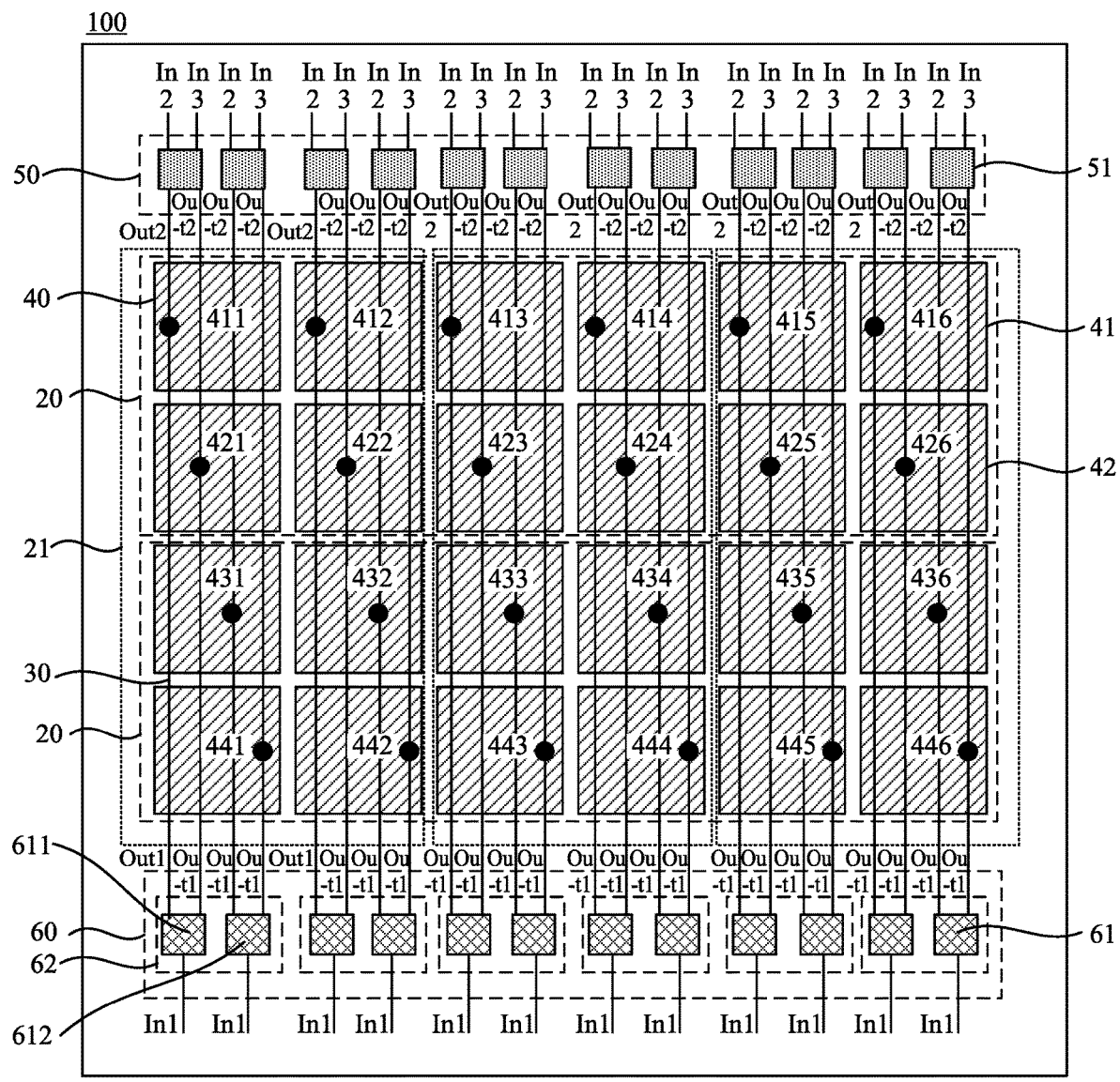
FIG. 5 is a structure view of another display panel provided by an embodiment of the present application.

On the basis of the preceding multiple embodiments, in some embodiments, FIG. 5 is a structure view of another display panel provided by an embodiment of the present application. In FIG. 5, the first detection circuit 50 is refined based on only of the preceding embodiments, but does not constitute a limitation of the present application. Referring to FIG. 5, the first detection circuit 50 includes multiple gating devices 51. Each gating device 51 includes a second input terminal in2, a third input terminal in3, and two second output terminals out2. The two second output terminals out2 of the each gating device 51 are electrically connected to a first touch electrode and a second touch electrode, respectively. The first touch electrode and the second touch electrode are located in the same first touch area group 20 and in the same touch electrode column. The first touch electrode and the second touch electrode may be, for example, the touch electrode 411 and the touch electrode 421; the touch electrode 431 and the touch electrode 441; the touch electrode 412 and the touch electrode 422; the touch electrode 432 and the touch electrode 442; the touch electrode 413 and the touch electrode 423; the touch electrode 433 and the touch electrode 443; the touch electrode 414 and the touch electrode 424; the touch electrode 434 and the touch electrode 444; the touch electrode 415 and the touch electrode 425; the touch electrode 435 and the touch electrode 445; the touch electrode 416 and the touch electrode 426; and the touch electrode 436 and the touch electrode 446.

The step in which at the first detection stage, the short-circuit detection signal is provided for the touch electrode 40 in the first touch electrode row 41 by the first detection circuit 50, and according to the short-circuit feedback signal generated by the second detection circuit 60, it is determined whether adjacent ones of the touch electrodes 40 located in the same column are short-circuited includes the steps described below.

At the first detection stage, the short-circuit detection signal is provided for the first touch electrode by the gating device 51, and according to the short-circuit feedback signal generated by the multiplex selection device 61 electrically connected to the first touch electrode, it is determined whether adjacent ones of the touch electrodes 40 in the same column are short-circuited.

The step in which at the first detection stage, the short-circuit detection signal is provided for the touch electrode 40 in the first touch electrode row 41 by the first detection circuit 50, and according to the short-circuit feedback signal generated by the first detection circuit 50, it is determined whether adjacent ones of the touch electrodes 40 in the same column are short-circuited includes the steps described below.

At the first detection stage, the short-circuit detection signal is provided for the second input terminal in2 to transmit the short-circuit detection signal to the first touch electrode by the gating device 51, and according to the short-circuit feedback signal generated by the third input terminal in3, it is determined whether adjacent ones of the touch electrodes 40 in the same column are short-circuited.

Exemplarily, the short-circuit detection signals are input to the second input terminals in2 of the gating devices 51, and then transmitted to the touch electrodes 411, 431, 412, 432, 413, 433, 414, 434, 415, 435, 416 and 436 by the gating devices 51. If the touch electrode 411 and the touch electrode 421 are short-circuited, the short-circuit detection signal received by the touch electrode 411 is transmitted to the touch electrode 421, and then output, by the touch wire 30 electrically connected to the touch electrode 421, to the multiplex selection device 61 electrically connected to the touch wire 30. If the touch electrode 431 and the touch electrode 421 are short-circuited, the short-circuit detection signal received by the touch electrode 431 is also transmitted to the touch electrode 421, and then output, by the touch wire 30 electrically connected to the touch electrode 421, to the multiplex selection device 61 electrically connected to the touch wire 30. Based on this, the multiplex selection device 61 feeds back one signal, i.e., the short-circuit feedback signal. According to the short-circuit feedback signal, it can be determined whether the touch electrode 411 and the touch electrode 421 are short-circuited; or whether the touch electrode 431 and touch electrode 421 are short-circuited, or whether the touch electrode 411 and touch electrode 421 are short-circuited and whether the touch electrode 431 and touch electrode 421 are short-circuited.

Exemplarily, the short-circuit detection signals are input to the second input terminals in2 of the gating devices 51, and then transmitted to the touch electrodes 411, 431, 412, 432, 413, 433, 414, 434, 415, 435, 416 and 436 by the gating devices 51. If the touch electrode 411 and the touch electrode 421 are short-circuited, the short-circuit detection signal received by the touch electrode 411 is transmitted to the touch electrode 421, and then output, by the touch wire 30 electrically connected to the touch electrode 421, to the gating device 51 electrically connected to the touch wire 30. If the touch electrode 431 and the touch electrode 421 are short-circuited, the short-circuit detection signal received by the touch electrode 431 is also transmitted to the touch electrode 421, and then output, by the touch wire 30 electrically connected to the touch electrode 421, to the gating device 51 electrically connected to the touch wire 30. The signal is fed back by the third input terminal in3 of the gating device 51, and according to the short-circuit feedback signal, it can be determined whether the touch electrode 411 and the touch electrode 421 are short-circuited; or whether the touch electrode 431 and touch electrode 421 are short-circuited, or whether the touch electrode 411 and touch electrode 421 are short-circuited and the touch electrode 431 and touch electrode 421 are short-circuited.

The above examples are illustrated by taking whether the touch electrodes 411, 421 and 431 in the first column are short-circuited as an example, and such method is also applicable to the touch electrodes in other columns and rows.

Figure 6:
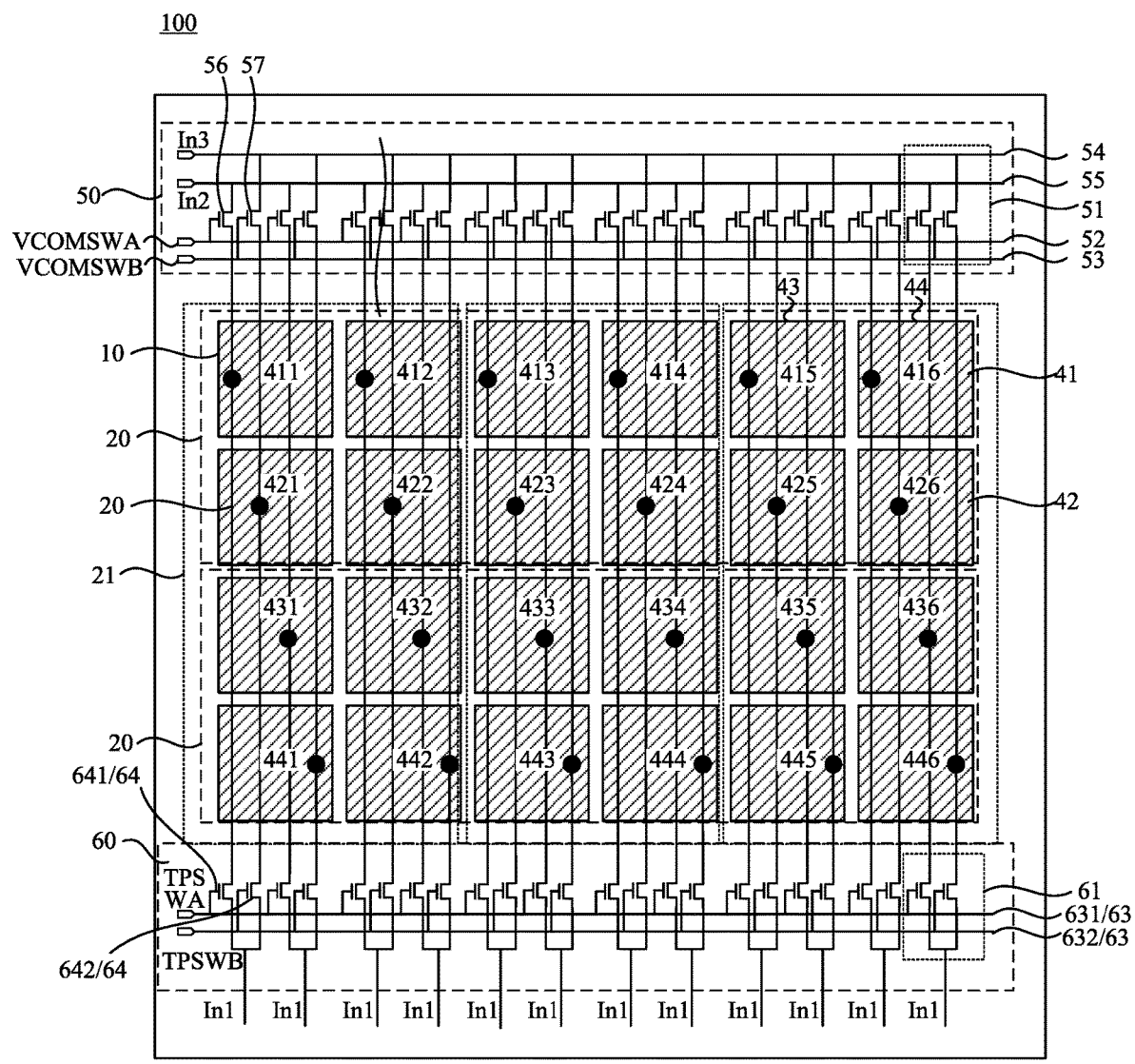
FIG. 6 is a structure view of another display panel provided by an embodiment of the present application.

On the basis of the preceding solutions, in some embodiments, FIG. 6 is a structure view of another display panel provided by an embodiment of the present application. As shown in FIG. 6, the first detection circuit further includes a second control line 52, a third control line 53, a first short-circuit signal supply line 54, and a second short-circuit signal supply line 55. A gating device 51 includes a second switching device 56 and a third switching device 57. A first terminal of the second switching device 56 is electrically connected to the second short-circuit signal supply line 55, and a second terminal of the second switching device 56 is electrically connected to the first touch electrode. The first touch electrode may be, for example, touch electrodes 411, 431, 412, 432, 413, 433, 414, 434, 415, 435, 416 and 436. A control terminal of the second switching device 56 is electrically connected to the second control line 52. A first terminal of the third switching device 57 is electrically connected to the first short-circuit signal supply line 54, and a second terminal of the third switching device 57 is electrically connected to a second touch electrode. The second touch electrode may be, for example, touch electrodes 421, 441, 422, 442, 423, 443, 424, 444, 425, 445, 426 and 446. A control terminal of the third switching device 57 is electrically connected to the third control line 53.

The step in which at the first detection stage, the short-circuit detection signal is provided for the touch electrode 40 in the first touch electrode row 41 by the gating device 51, and according to the short-circuit feedback signal generated by the multiplex selection device 61 electrically connected to the touch electrode 40, it is determined whether the adjacent touch electrodes 40 in the same column are short-circuited includes the steps described below.

At the first detection stage, a second enable signal is transmitted to the second control line 52 to transmit the short-circuit detection signal transmitted by the second short-circuit signal supply line 55 to the first touch electrode by the second switching device 56, and according to the short-circuit feedback signal generated by the multiplex selection device 61 electrically connected to the first touch electrode, it is determined whether adjacent ones of the touch electrodes 40 in the same column are short-circuited.

The step in which at the first detection stage, the short-circuit detection signal is provided for the touch electrode 40 in the first touch electrode row 41 by the gating device 51, and according to the short-circuit feedback signal generated by the gating device 51, it is determined whether adjacent ones of the touch electrodes 40 in the same column are short-circuited includes the steps described below.

At the first detection stage, the second enable signal is transmitted to the second control line 52 to transmit the short-circuit detection signal transmitted by the second short-circuit signal supply line 55 to the first touch electrode by the second switching device 56. In one embodiment, the third control line 53 receives the third enable signal to turn on the third switching device 57. According to the short-circuit feedback signal generated by the first short-circuit signal supply line 54, it is determined whether adjacent ones of the touch electrodes 40 in the same column are short-circuited.

The step in which at the first detection stage, the short-circuit detection signal is provided for the first touch electrode by the gating device 51, and according to the short-circuit feedback signal generated by the multiplex selection device 61 electrically connected to the first touch electrode, it is determined whether adjacent ones of the touch electrodes 40 in the same column are short-circuited includes the steps described below.

At the first detection stage, the second enable signal is transmitted to the second control line 52 to transmit the short-circuit detection signal transmitted by the second short-circuit signal supply line 55 to the first touch electrode by the second switching device 56, and according to the short-circuit feedback signal generated by the multiplex selection device 61 electrically connected to the first touch electrode, it is determined whether adjacent ones of the touch electrodes 40 in the same column are short-circuited.

The step in which at the first detection stage, the short-circuit detection signal is provided for the second input terminal in2 to transmit the short-circuit detection signal to the first touch electrode by the gating device 51, and according to the short-circuit feedback signal generated by the third input terminal in3, it is determined whether adjacent ones of the touch electrodes 40 in the same column are short-circuited includes the steps described below.

At the first detection stage, the second enable signal is transmitted to the second control line 52 to transmit the short-circuit detection signal transmitted by the second short-circuit signal supply line 55 to the first touch electrode by the second switching device 56. In one embodiment, the third control line 53 receives the third enable signal to turn on the third switching device 57. According to the short-circuit feedback signal generated by the first short-circuit signal supply line 54, it is determined whether adjacent ones of the touch electrodes 40 in the same column are short-circuited.

Exemplarily, referring to FIG. 6, at the first detection stage, the second enable signal is transmitted to the second control line 52, the second switching devices 56 of the multiple gating devices 51 are turned on, and the short-circuit detection signals transmitted by the second input terminals in2 are transmitted to the touch electrodes 411, 431, 412, 432, 413, 433, 414, 434, 415, 435, 416 and 436 by the second short-circuit signal supply line 55 and the turned-on second switching devices 56. If the touch electrode 411 and the touch electrode 421 are short-circuited, the short-circuit detection signal received by the touch electrode 411 is transmitted to the touch electrode 421, and then output, by the touch wire 30 electrically connected to the touch electrode 421, to the multiplex selection device 61 electrically connected to the touch wire 30. If the touch electrode 431 and the touch electrode 421 are short-circuited, the short-circuit detection signal received by the touch electrode 431 is also transmitted to the touch electrode 421, and then output to the multiplex selection device 61 by the touch wire 30 electrically connected to the touch electrode 421. Based on this, the multiplex selection device 61 feeds back one signal, i.e., the short-circuit feedback signal. According to the short-circuit feedback signal, it can be determined whether the touch electrode 411 and the touch electrode 421 are short-circuited; or whether the touch electrode 431 and touch electrode 421 are short-circuited, or whether the touch electrode 411 and touch electrode 421 are short-circuited and the touch electrode 431 and touch electrode 421 are short-circuited.

Exemplarily, at the first detection stage, the second enable signal is transmitted to the second control line 52, the second switching devices 56 of the multiple gating devices 51 are turned on, and the short-circuit detection signals transmitted by the second input terminals in2 are transmitted to the touch electrodes 411, 431, 412, 432, 413, 433, 414, 434, 415, 435, 416 and 436 by the second short-circuit signal supply line 55 and the turned-on second switching device 56. If the touch electrode 411 and the touch electrode 421 are short-circuited, the short-circuit detection signal received by the touch electrode 411 is transmitted to the touch electrode 421, and then output, by the touch wire 30 electrically connected to the touch electrode 421, to the third switching device 57 electrically connected to the touch wire 30. If the touch electrode 431 and the touch electrode 421 are short-circuited, the short-circuit detection signal received by the touch electrode 431 is also transmitted to the touch electrode 421, and output to the third switching device 57 by the touch wire 30 electrically connected to the touch electrode 421. The signal is fed back by the third switching device 57 and the third input terminal in3. According to the short-circuit feedback signal, it can also be determined whether the touch electrode 411 and the touch electrode 421 are short-circuited; or whether the touch electrode 431 and touch electrode 421 are short-circuited, or whether the touch electrode 411 and touch electrode 421 are short-circuited and whether the touch electrode 431 and touch electrode 421 are short-circuited.

The above examples are illustrated by taking whether the touch electrodes 411, 421 and 431 in the first column are short-circuited as an example, and such method is also applicable to the touch electrodes in other columns and rows.

How to detect the working process of whether the adjacent touch electrodes are short-circuited is described below in combination with the timing diagram of multiple signals in the first detection circuit and the second detection circuit. The working process is described with reference only to the structure of the display panel shown in FIG. 6, and the timing diagram of the signals in the display panel in other structures is basically the same as this, and will not be described herein.

Figure 7:
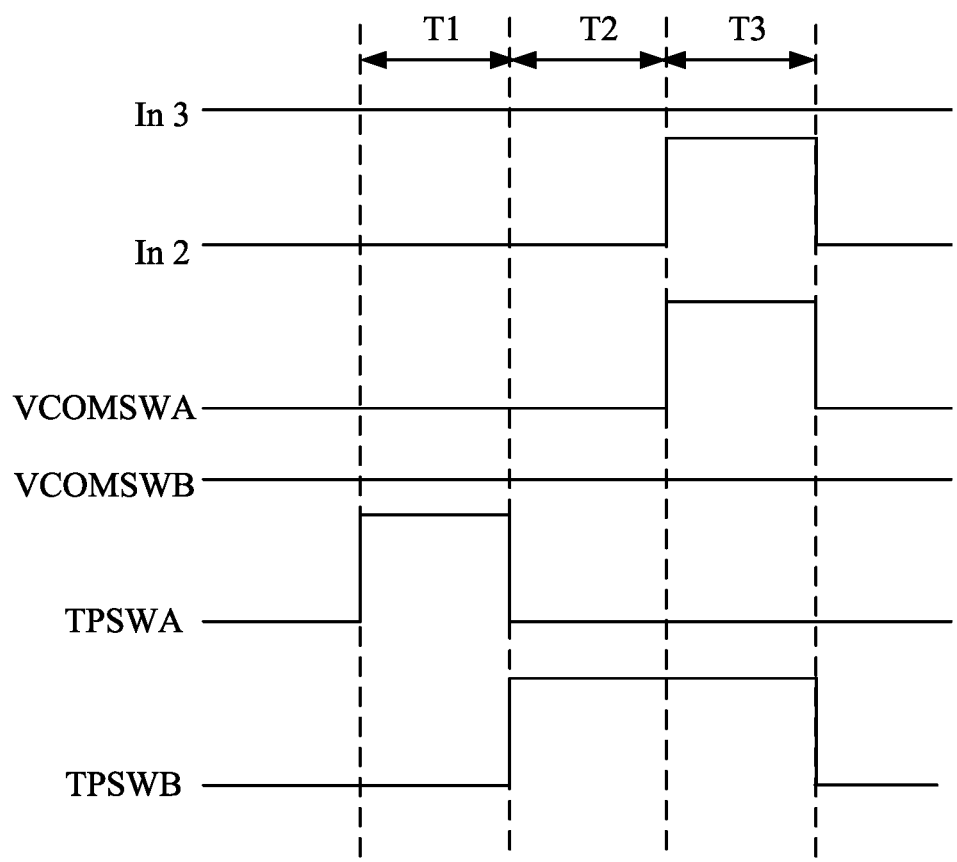
FIG. 7 is a timing diagram of multiple signals in a first detection circuit and a second detection circuit provided by an embodiment of the present application.

FIG. 7 is a timing diagram of multiple signals in the first detection circuit and the second detection circuit provided by the embodiment of the present application. Referring to FIGS. 6 and 7, in a time period T1, i.e., the first detection sub-stage in the above embodiments, a signal VCOMSWA transmitted by the second control line 52 is a low level, a signal VCOMSWB transmitted by the third control line 53 is a low level, a signal TPSWA transmitted by one of first control lines 631 electrically connected to the first switching devices 641 having an arrangement number of one in the first control line 63 is a high level, a signal TPSWB transmitted by one of first control lines 632 electrically connected to the first switching devices 642 having an arrangement number of two in the first control line 63 is a low level. The second switching device 56, the third switching device 57 and the first switching devices 642 having the arrangement number of two are turned off, the first switching devices 641 having the arrangement number of one are turned on. The short-circuit detection signals inputted from the first input terminals in1 corresponding to the first touch electrode columns 43 are transmitted to the touch electrodes 411, 413, 415, 431, 433, 435 by the first switching devices 641 having the arrangement number of one. If the touch electrode 411 and the touch electrode 412 are short-circuited, the short-circuit detection signal received by the touch electrode 411 is transmitted to the touch electrode 412, and then output, by the touch wire 30 electrically connected to the touch electrode 412, to the first switching device 641 electrically connected to the touch wire 30, located in the second touch electrode column 44 and having the arrangement number of one. If the touch electrode 413 and the touch electrode 412 are short-circuited, the short-circuit detection signal received by the touch electrode 413 is transmitted to the touch electrode 412, and then output, by the touch wire 30 electrically connected to the touch electrode 412, to the first switching device 64 electrically connected to the touch wire 30, located in the second touch electrode column 44 and having the arrangement number of one. Since the first switching device 641 is turned on, the short-circuit detection signal (the short-circuit feedback signal) is output by the first input terminal in1 corresponding to the second touch electrode column 44 and the first switching device 641. According to the short-circuit feedback signal, it can be determined whether the touch electrode 411 and the touch electrode 412 are short-circuited; or whether the touch electrode 413 and the touch electrode 412 are short-circuited; or whether the touch electrode 411 and the touch electrode 412 are short-circuited and whether the touch electrode 413 and the touch electrode 412 are short-circuited. Similarly, if the touch electrode 431 and the touch electrode 432 are short-circuited, the short-circuit detection signal received by the touch electrode 431 is transmitted to the touch electrode 432, and then output, by the touch wire 30 electrically connected to the touch electrode 432, to the first switching device 64 electrically connected to the touch wire 30, located in the second touch electrode column 44 and having the arrangement number of one. If the touch electrode 433 and the touch electrode 432 are short-circuited, the short-circuit detection signal received by the touch electrode 433 is transmitted to the touch electrode 432, and then output, by the touch wire 30 electrically connected to the touch electrode 432, to the first switching device 64 electrically connected to the touch wire 30, located in the second touch electrode column 44 and having the arrangement number of one. Since the first switching device 64 is turned on, the short-circuit detection signal (the short-circuit feedback signal) is output by the first switching device 64, and according to the short-circuit feedback signal, it can be determined whether the touch electrode 431 and the touch electrode 432 are short-circuited; or whether the touch electrode 433 and the touch electrode 432 are short-circuited; or whether the touch electrode 431 and the touch electrode 432 are short-circuited and whether the touch electrode 433 and the touch electrode 432 are short-circuited. Meanwhile, it can also be determined whether the touch electrode 413 and the touch electrode 414 are short-circuited; or whether the touch electrode 415 and the touch electrode 414 are short-circuited; or whether the touch electrode 413 and the touch electrode 414 are short-circuited and whether the touch electrode 415 and the touch electrode 414 are short-circuited. In one embodiment, it can also be determined whether the touch electrode 433 and the touch electrode 434 are short-circuited; or whether the touch electrode 435 and the touch electrode 434 are short-circuited; or whether the touch electrode 433 and the touch electrode 434 are short-circuited and whether the touch electrode 434 and the touch electrode 435 are short-circuited. In one embodiment, it can also be determined whether the touch electrode 415 and the touch electrode 416 are short-circuited, and it can also be determined whether the touch electrode 435 and the touch electrode 436 are short-circuited.

In a time period T2, i.e., the second detection sub-stage in the above embodiment, the signal VCOMSWA transmitted by the second control line 52 is a low level, the signal VCOMSWB transmitted by the third control line 53 is a low level, the signal TPSWA transmitted by one of first control lines 631 electrically connected to the first switching devices 641 having the arrangement number of one in the first control line 63 is a low level, the signal TPSWB transmitted by one of the first control lines 632 electrically connected to the first switching devices 642 having the arrangement number of two in the first control line 63 is a high level. The second switching devices 56, the third switching devices 57 and the first switching devices 641 having the arrangement number of one are turned off, and the short-circuit detection signals inputted from the first input terminals in1 corresponding to the first touch electrode column 43 are transmitted to the touch electrodes 421, 423, 425, 441, 443 and 445 by the first switching devices 642 having the arrangement number of two. If the touch electrode 421 and the touch electrode 422 are short-circuited, the short-circuit detection signal received by the touch electrode 421 is transmitted to the touch electrode 422, and then output, by the touch wire 30 electrically connected to the touch electrode 422, to the first switching device 642 electrically connected to the touch wire 30, located in the second touch electrode column 44 and having the arrangement number of two. If the touch electrode 423 and the touch electrode 422 are short-circuited, the short-circuit detection signal received by the touch electrode 423 is transmitted to the touch electrode 422, and then output, by the touch wire 30 electrically connected to the touch electrode 422, to the first switching device 642 electrically connected to the touch wire 30, located in the second touch electrode column 44 and having the arrangement number of two. Since the first switching device 642 is turned on, the short-circuit detection signal (the short-circuit feedback signal) is output by the first input terminal in1 corresponding to the second touch electrode column 44 and the first switching device 642. According to the short-circuit feedback signal, it can be determined whether the touch electrode 421 and the touch electrode 422 are short-circuited; or whether the touch electrode 423 and the touch electrode 422 are short-circuited; or whether the touch electrode 421 and the touch electrode 422 are short-circuited and whether the touch electrode 423 and the touch electrode 422 are short-circuited. Similarly, if the touch electrode 441 and the touch electrode 442 are short-circuited, the short-circuit detection signal received by the touch electrode 441 is transmitted to the touch electrode 442, and then output, by the touch wire 30 electrically connected to the touch electrode 442, to the first switching device 642 electrically connected to the touch wire 30, located in the second touch electrode column 44 and having the arrangement number of two. If the touch electrode 443 and the touch electrode 442 are short-circuited, the short-circuit detection signal received by the touch electrode 443 is transmitted to the touch electrode 442, and then output, by the touch wire 30 electrically connected to the touch electrode 442, to the first switching device 642 electrically connected to the touch wire 30, located in the second touch electrode column 44 and having the arrangement number of two. Since the first switching device 642 is turned on, the short-circuit detection signal (the short-circuit feedback signal) is output by the first switching device 642, and according to the short-circuit feedback signal, it can be determined whether the touch electrode 441 and the touch electrode 442 are short-circuited; or whether the touch electrode 443 and the touch electrode 442 are short-circuited; or whether the touch electrode 441 and the touch electrode 442 are short-circuited and whether the touch electrode 443 and the touch electrode 442 are short-circuited. Meanwhile, it can also detect whether the touch electrode 423 and the touch electrode 424 are short-circuited; or whether the touch electrode 425 and the touch electrode 424 are short-circuited; or the touch electrode 423 and the touch electrode 424 are short-circuited and whether the touch electrode 425 and the touch electrode 424 are short-circuited. In one embodiment, it can also be detected whether the touch electrode 443 and the touch electrode 444 are short-circuited; or whether the touch electrode 445 and the touch electrode 444 are short-circuited; or the touch electrode 443 and the touch electrode 444 are short-circuited and whether the touch electrode 444 and the touch electrode 445 are short-circuited. In one embodiment, it can also be detected whether the touch electrode 425 and the touch electrode 426 are short-circuited, and whether the touch electrode 445 and the touch electrode 446 are short-circuited.

In a time period T3, i.e., the first detection stage in the above embodiment, the signal VCOMSWA transmitted by the second control line 52 is a high level, the signal VCOMSWB transmitted by the third control line 53 is a high level, the signal TPSWA transmitted by one of first control lines 631 electrically connected to the first switching devices 641 having the arrangement number of one in the first control line 63 is a low level, the signal TPSWB transmitted by one of the first control lines 632 electrically connected to the first switching devices 642 having the arrangement number of two in the first control line 63 is a high level. The third switching devices 57 and the first switching devices 641 having the arrangement number of one are turned off, and the second switching devices 56 and the first switching devices 642 having the arrangement number of two are turned off, and the short-circuit detection signals transmitted by the second short-circuit signal supply line 55 is transmitted to the touch electrodes 411, 431, 412, 432, 413, 433, 414, 434, 415, 435, 416 and 436 by the turned-on second switching devices 56. If the touch electrode 411 and the touch electrode 421 are short-circuited, the short circuit detection signal received by the touch electrode 411 is transmitted to the touch electrode 421, and then output, by the touch wire 30 electrically connected to the touch electrode 421, to the first switching device 642 electrically connected to the touch wire 30 and having the arrangement number of two. If the touch electrode 431 and the touch electrode 421 are short-circuited, the short-circuit detection signal received by the touch electrode 431 is also transmitted to the touch electrode 421, and then output to the first switching device 642 having the arrangement number of two by the touch wire 30 electrically connected to the touch electrode 421. Based on this, the first switching device 642 having the arrangement number of two feeds back one signal, i.e., the short-circuit feedback signal. According to the short-circuit feedback signal, it can be determined whether the touch electrode 411 and the touch electrode 421 are short-circuited; or whether the touch electrode 431 and the touch electrode 421 are short-circuited; or whether the touch electrode 411 and the touch electrode 421 are short-circuited and whether the touch electrode 431 and the touch electrode 421 are short-circuited. The above examples are illustrated by taking whether the touch electrodes 40 in the first column are short-circuited as an example, and such method is also applicable to the touch electrodes in other columns, and are not described in detail herein.

Figure 8:
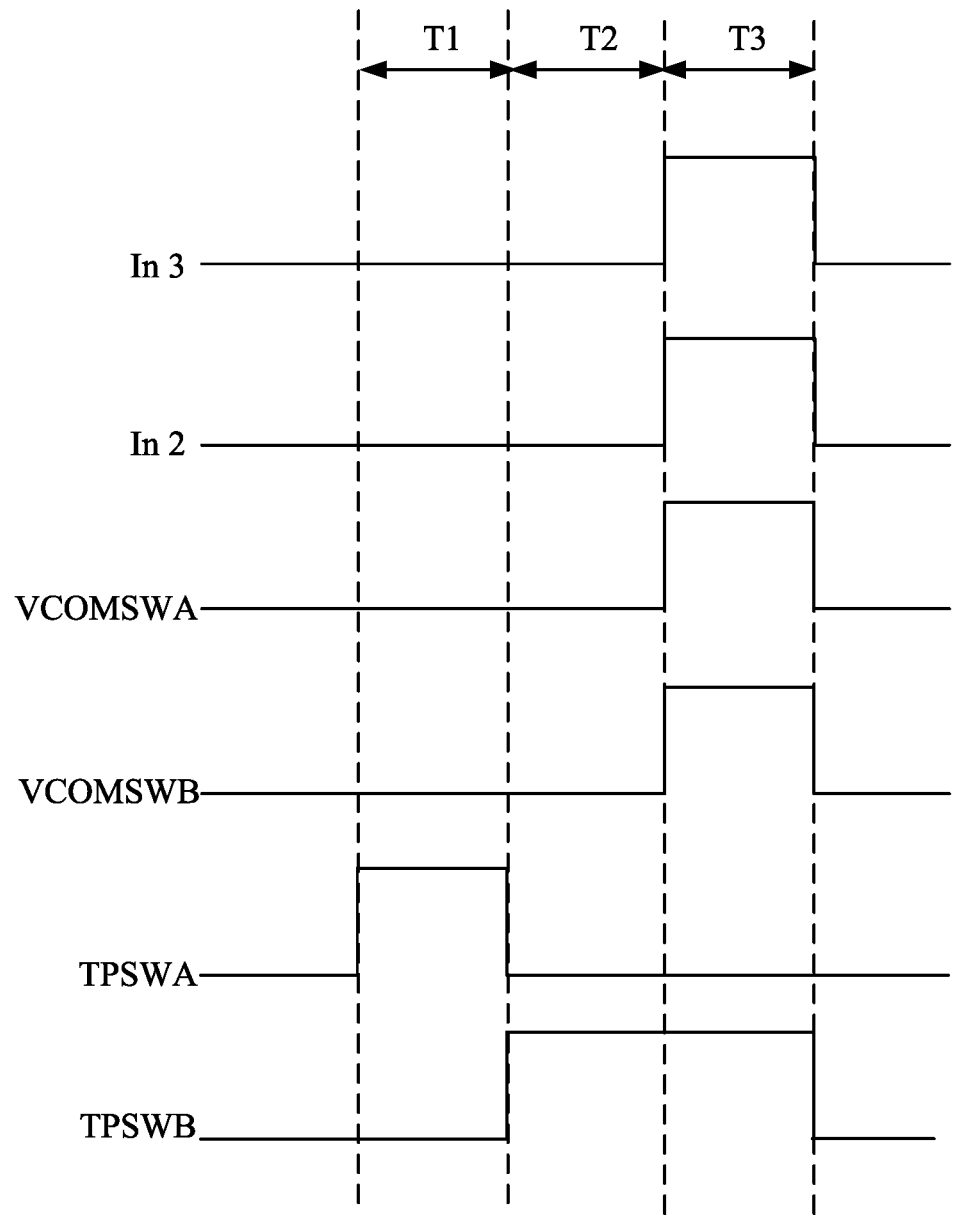
FIG. 8 is another timing diagram of multiple signals in the first detection circuit and the second detection circuit provided by an embodiment of the present application.

FIG. 7 is just a timing diagram provided by the embodiment of the present application, but the detection of the timing diagram is not limited to that shown in FIG. 7. In other embodiments, exemplarily, FIG. 8 is another timing diagram of multiple signals in the first detection circuit and the second detection circuit provided by an embodiment of the present application. The difference from FIG. 7 is that in FIG. 8, the signal VCOMSWB transmitted by the third control line 53 in the time period of T3, i.e., the first detection stage in the preceding embodiment, is a high level, in this case, the third switching device 57 is also turned on. In this way, according to the signal fed back by the third switching device 57, it can also be determined whether the touch electrode 411 and the touch electrode 421 are short-circuited; or whether the touch electrode 431 and the touch electrode 421 are short-circuited; or whether the touch electrode 411 and the touch electrode 421 are short-circuited and whether the touch electrode 431 and the touch electrode 421 are short-circuited.

In one embodiment, the first switching device 64, the second switching device 56, and the third switching device 57 in the preceding embodiments may all be a device having a switching function such as a thin-film transistor, a metal-oxide-semiconductor field-effect transistor (MOS) or the like.

Figure 9:
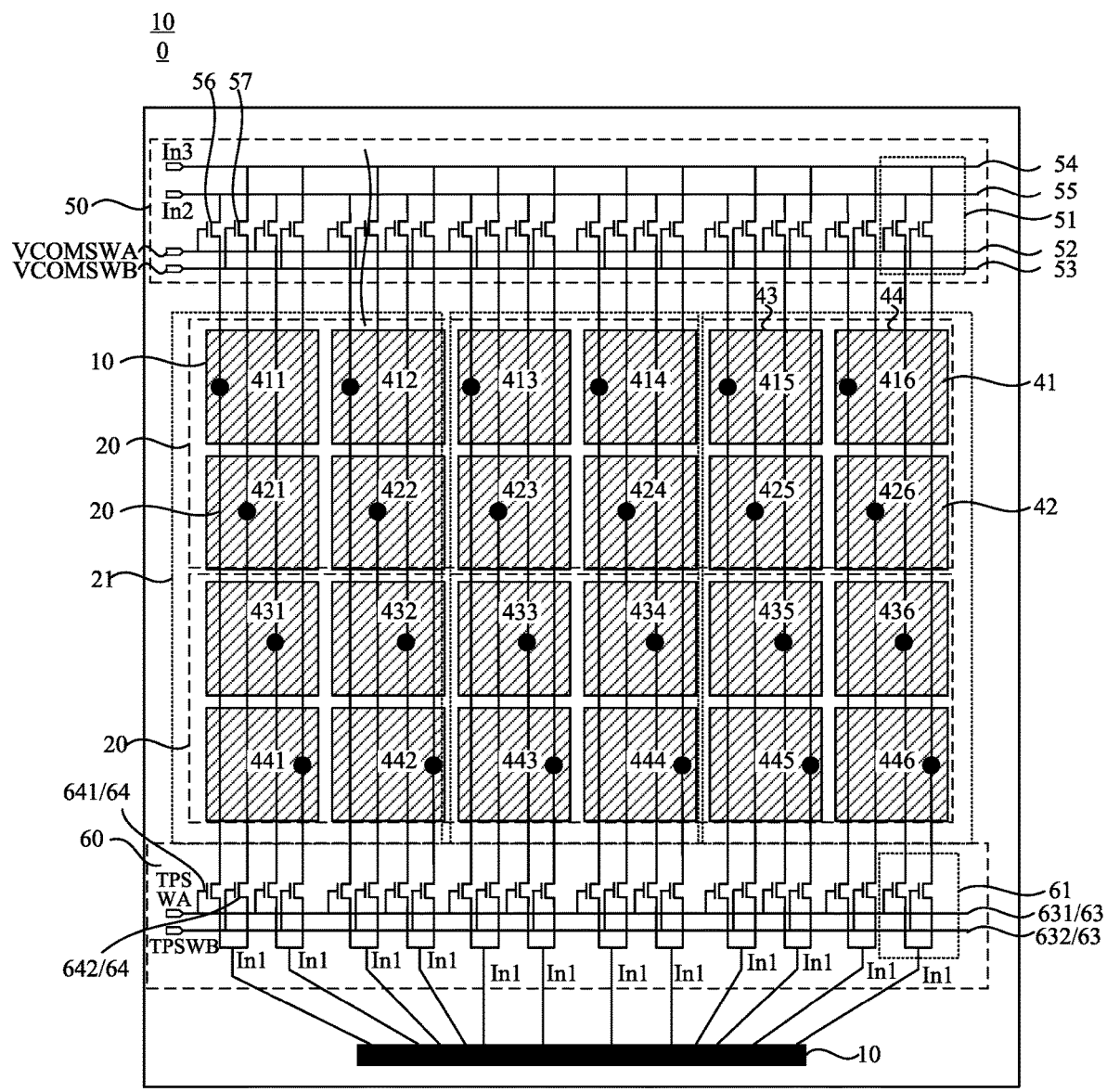
FIG. 9 is a structure view of another display panel provided by an embodiment of the present application.

In the preceding multiple embodiments, whether the touch electrodes are short-circuited may be detected before the driver chip is bound, that is, after the preparation of the display panel is completed, the short-circuit detection is performed on the touch electrode first; if the adjacent touch electrodes are not short-circuited, the driver chip can be bound; and if the adjacent touch electrodes are short-circuited, the driver chip is not bound, and thus preventing the waste of materials such as the driver chip caused by the detection of poor touch electrodes after the driver chip is bound, to reduce the production cost of the display panel. However, this is only one solution of the present application. In other embodiments, the short-circuit detection of the adjacent touch electrodes can be performed after the driver chip is bound. For example, FIG. 9 is a structure view of another display panel provided by an embodiment of the present application. As shown in FIG. 9, the display panel 100 further includes a driver chip 10 by which the short-circuit detection of adjacent touch electrodes is performed in the preceding multiple embodiments. In one embodiment, the driver chip 10 is configured to provide, at the first detection stage, a short-circuit detection signal for the touch electrode 40 in the first touch electrode row 41 by the first detection circuit 50, and determine, according to the short-circuit feedback signal generated by the second detection circuit 60, whether adjacent ones of the touch electrodes 40 located in the same column are short-circuited. The driver chip 10 is further configured to provide, at the first detection stage, the short-circuit detection signal for the touch electrode 40 in the first touch electrode row 41 by the first detection circuit 50, and determine, according to the short-circuit feedback signal generated by the first detection circuit 50, whether adjacent ones of the touch electrodes 40 in the same column are short-circuited. The driver chip is further configured to provide, at the second detection stage, the short-circuit detection signal for the touch electrode 40 in the first touch electrode column 43 by the multiplex selection device 61 corresponding to the first touch electrode column 43; and determine, according to the short-circuit feedback signal generated by the multiplex selection device 61 corresponding to the second touch electrode column 44, whether the touch electrodes 40 in the same row are short-circuited. The driver chip 10 is further configured to transmit, at the i-th detection sub-stage, a first enable signal to an i-th first control line 63 to provide the short-circuit detection signal to the touch electrode 40 located in the first touch electrode column 43 by a first switching device 64 having an arrangement number of i, and determine, according to the short-circuit feedback signal generated by the first switching device 64 having the arrangement number of i and corresponding to the second touch electrode column 44, whether the touch electrodes 40 in a n×i-th row are short-circuited, where n is 1, 2, . . . , Z/M, n is a positive integer, and Z is a total number of rows of the touch electrodes. The driver chip 10 is further configured to provide, at the first detection stage, the short-circuit detection signal for a first touch electrode 40 by the first detection circuit 50, and determine, according to the short-circuit feedback signal generated by the first switching device 64 electrically connected to a second touch electrode 40, whether adjacent ones of the touch electrodes 40 in the same column are short-circuited. The first touch electrode 40 and the second touch electrode 40 are located in the same first touch area group 20 and in the same touch electrode column. The driver chip 10 is further configured to provide, at the first detection stage, the short-circuit detection signal for the first touch electrode 40 by the gating device 51, and determine, according to the short-circuit feedback signal generated by the multiplex selection device 61 electrically connected to the first touch electrode 40, whether adjacent ones of the touch electrodes 40 in the same column are short-circuited. The driver chip 10 is further configured to provide, at the first detection stage, the short-circuit detection signal for the second input terminal in2 to transmit the short-circuit detection signal to the first touch electrode 40 by the gating device 51, and determine, according to the short-circuit feedback signal generated by the third input terminal in3, whether adjacent ones of the touch electrodes 40 in the same column are short-circuited. The driver chip 10 is further configured to transmit, at the first detection stage, a second enable signal to a second control line 52 to turn on a second switching device 56, and transmit the short-circuit detection signal to the first touch electrode 40 by a second short-circuit signal supply line 55 and the second switching device 56 sequentially, and determine, according to the short-circuit feedback signal generated by the multiplex selection device 61 electrically connected to the first touch electrode 40, whether adjacent ones of the touch electrodes 40 in the same column are short-circuited. The driver chip 10 is further configured to transmit, at the first detection stage, a third enable signal to a third control line 53 to turn on a third switching device 57, and determine, according to the short-circuit feedback signal generated by a first short-circuit signal supply line 54, whether adjacent ones of the touch electrodes 40 in the same column are short-circuited.

In the preceding embodiments, the display panel may be a liquid crystal display panel or an organic light-emitting display panel. To reduce the cost and simplify the process, in this embodiment, the structure in the display panel is also used as the touch electrodes, for example, in a case where the display panel is the liquid crystal display panel, a common electrode of the liquid crystal display panel is also used as the touch electrode. In a case where the display panel is the organic light-emitting display panel, a cathode of the organic light-emitting display panel is also used as the touch electrode.

Based on this, in one embodiment, the display panel further includes a dot screen test stage. The detection method further includes the step described below. At the dot screen test stage, a dot screen test signal is provided for multiple touch electrodes by the first detection circuit 50 or the second detection circuit 60 to determine whether the display panel displays abnormally. The dot screen test stage may be before the touch short-circuit detection stage or may be after the touch short-circuit detection stage.

The driver chip 10 is configured to provide, at the dot screen test stage, the dot screen test signal for the multiple touch electrodes 40 by the first detection circuit 50 or the second detection circuit 60 to determine whether the display panel displays abnormally.

The driver chip 10 is configured to provide, at the display sub-stage, a common signal for the multiple touch electrodes 40 by the first detection circuit 50 and the second detection circuit 60 separately to perform display driving on sub-pixels in the display panel.

The driver chip 10 is configured to provide, at the touch sub-stage, a touch scanning signal for the touch electrodes by the second detection circuit 60 in a time division manner, and determine, according to a touch detection signal fed back by the second detection circuit 60, a touch position. Before the driver chip is bound, generally, it is necessary to perform a dot screen test on the display panel to determine whether the display panel works normally. Since the common electrode (the liquid crystal display panel) or the cathode (the organic light-emitting display panel) is also used as the touch electrode, the first detection circuit or the second detection circuit may be used for providing a corresponding dot screen test signal to the touch electrode to determine whether the display panel is normal.

Exemplarily, referring to FIG. 6, at the dot screen test stage, the signals transmitted by the second control line 52 and the third control line 53 are enable signals to turn on the second switching device 56 and the third switching device 57. The dot screen test signal transmitted by the first short-circuit signal supply line 54 and the second short-circuit signal supply line 55 is transmitted to the multiple touch electrodes 40 by the turned-on second switching device 56 and the turned-on third switching device 57 to determine whether the display panel displays abnormally. In one embodiment, at the dot screen test stage, the signal transmitted by the first control line 63 is the enable signal to turn on the first switching device 64. The dot screen test signal transmitted by the first input terminal in1 is transmitted to the multiple touch electrodes by the turned-on first switching device 64 to determine whether the display panel displays abnormally.

In the solution, the first detection circuit and the second detection circuit not only can detect whether the adjacent touch electrodes are short-circuited, but also can achieve the dot screen test of the display panel without setting a corresponding circuit separately, to simplify the structure of the display panel, reduce the preparation process of the display panel, improve the preparation efficiency of the display panel, and reduce the preparation cost of the display panel.

On the basis of the preceding multiple solutions, in some embodiments, the display panel further includes a display stage.

The display stage includes a display sub-stage and a touch sub-stage. The detection method further includes the steps described below. At the display sub-stage, a common signal is provided for the multiple touch electrodes 40 by the first detection circuit 50 and the second detection circuit 60 separately to perform display driving on sub-pixels in the display panel. At the touch sub-stage, a touch scanning signal is provided for the touch electrodes 40 by the second detection circuit 60 in a time division manner, and according to a touch detection signal fed back by the second detection circuit 60, a touch position is determined.

After the dot screen test detection of the display panel and the detection of whether the adjacent touch electrodes are short-circuited are completed, the driver chip may be bound in the display panel to achieve normal display and touch by controlling the display panel through the driver chip, that is, the driver chip is configured to provide, at the display sub-stage, the common signal to the multiple touch electrodes by the first detection circuit and the second detection circuit separately, to perform display driving on the sub-pixels in the display panel. The driver chip is configured to provide, at the touch sub-stage, the touch scanning signal for the touch electrodes by the second detection circuit in the time division manner, and determine, according to the touch detection signal fed back by the second detection circuit, the touch position.

Exemplarily, referring to FIG. 9, at the display sub-stage, the driver chip 10 provides the enable signal to the second control line 52 and the third control line 53 and the enable signal to the first control line 63 to turn on the second switching device 56, the third switching device 57 and the first switching device 64. The common signal is provided for the first input terminal in1, the first short-circuit signal supply line 54, and the second short-circuit signal supply line 55 by the driver chip 10, and the common signal is transmitted to the multiple touch electrodes 40 by the turned-on second switching device 56, the turned-on third switching device 57, and the turned-on first switching device 64. Since each touch electrode 40 may receive the common signal provided by the first detection circuit 50 and the second detection circuit 60, the problem of display unevenness caused by different common signals received by different touch electrode due to the voltage drop can be alleviated.

In the touch sub-stage, the touch scanning signal is provided for the touch electrode only by the second detection circuit in the time division manner, and the touch position is determined according to the touch detection signal fed back by the second detection circuit. Exemplarily, referring to FIG. 9, at a first time, one of first control lines 631 electrically connected to the first switching devices 641 having an arrangement number of one transmits the enable signal, and the first switching devices 641 having the arrangement number of one in the multiplex selection devices 61 are turned on to transmit the touch scanning signal transmitted by the first input terminals in1 to the touch electrodes 411, 412, 413, 414, 415, 416, 431, 432, 433, 434, 435 and 436. At a second time, one of first control lines 632 electrically connected to the first switching devices 642 having an arrangement number of two transmits the enable signal, and the first switching devices 642 having the arrangement number of two in the multiplex selection devices 61 are turned on to transmit the touch scanning signal transmitted by the first input terminals in1 to the touch electrodes 421, 422, 423, 424, 425, 426, 441, 442, 443, 444, 445 and 446 to complete the scanning of all touch electrodes 40 in the touch display panel. The touch position is then determined according to the touch detection signal fed back by each touch electrode 40.

In summary, in the display panel and the detection method provided by the embodiments of the present application, by the first detection circuit and the second detection circuit, not only the detection of whether adjacent touch electrodes are short-circuited can be completed, but also the dot screen test detection of the display panel as well as the normal display and touch of the display panel in the subsequent application of the display panel to the actual product can be completed.

Based on the same concept, an embodiment of the present application further provides a driver chip. The driver chip is capable of executing the detection method provided by any embodiment of the present application, and has function devices and beneficial effects corresponding to the detection method.

Figure 10:
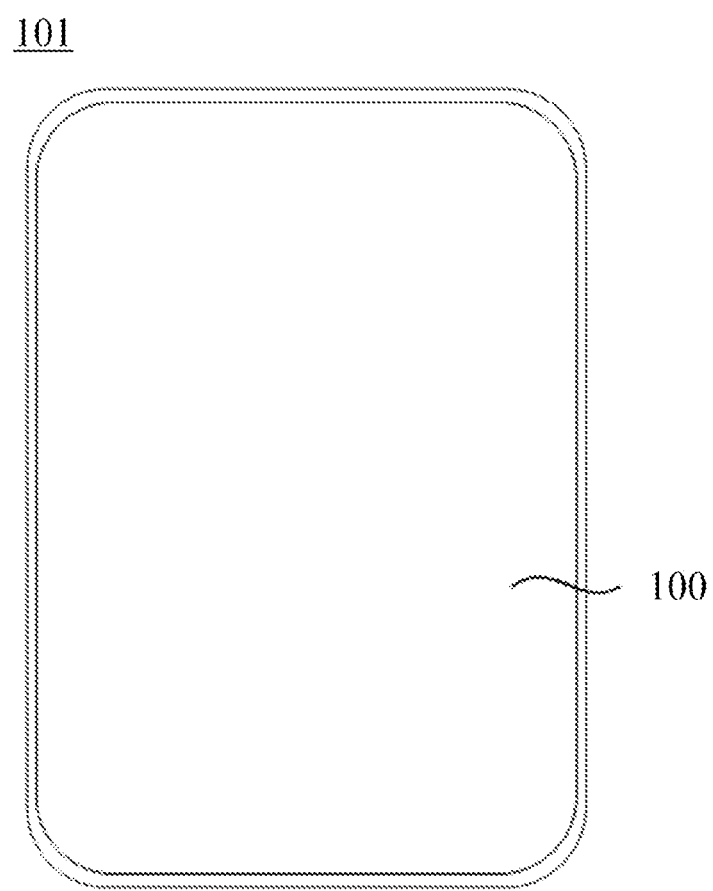
FIG. 10 is a structure view of a display device provided by an embodiment of the present application.

Based on the same concept, an embodiment of the present application further provides a display device. The display device includes any display panel provided in the preceding embodiments. Exemplarily, as shown in FIG. 10, the display device 101 includes a display panel 100. Therefore, the display device also has the beneficial effects of the display panel described in the preceding embodiments, and for the same details, reference may be made to the description of the preceding display panel, and repetition will not made herein.

The display device 101 provided in the embodiments of the present application may be the phone shown in FIG. 10 or may be any electronic product with a display function, including and not limited to: televisions, laptops, desktop displays, tablet computers, digital cameras, smart bracelets, smart glasses, in-vehicle displays, industry-controlling equipment, medical displays, touch interactive terminals, etc., which will not be specifically limited in embodiments of the present application.

What is claimed is:

1. A detection method, wherein a display panel comprises:
at least one first touch area group and a plurality of touch wires; the at least one first touch area group comprises two rows and N columns of touch electrodes; and each touch wire of the plurality of touch wires is electrically connected to a respective one touch electrode of the two rows and N columns of touch electrodes; wherein N≥1 and N is a positive integer;
the display panel further comprises: a first detection circuit and a second detection circuit;
and each touch electrode of the two rows and N columns of touch electrodes is separately electrically connected to the first detection circuit and the second detection circuit by a respective one of the plurality of touch wires;
the two rows and N columns of touch electrodes comprise a first touch electrode row and a second touch electrode row, wherein the first touch electrode row is adjacent to the second touch electrode row; and
the display panel comprises a touch short-circuit detection stage, wherein the touch short-circuit detection stage comprises a first detection stage; and
the detection method comprises:
providing, at the first detection stage, a short-circuit detection signal for a touch electrode in the first touch electrode row by the first detection circuit; and
determining, according to a short-circuit feedback signal generated by the second detection circuit, whether adjacent ones of the touch electrodes located in a same column are short-circuited,
wherein the second detection circuit comprises a plurality of multiplex selection devices; and each multiplex selection device of the plurality of multiplex selection devices comprises a first input terminal and a number M of first output terminals, wherein M≥2 and M is a positive integer; and
the number M of first output terminals of the each multiplex selection device are in one-to-one correspondence with and electrically connected to a number M of adjacent ones of the touch electrodes located in the same column by a number M of touch wires; and
the detection method further comprises:
providing, at the first detection stage, the short-circuit detection signal for the touch electrode in the first touch electrode row by the first detection circuit, and determining, according to a short-circuit feedback signal generated by the first detection circuit, whether adjacent ones of the touch electrodes located in the same column are short-circuited.

2. The detection method of claim 1, wherein the display panel further comprises at least one second touch area group; and the at least one second touch area group comprises two columns and L rows of touch electrodes, wherein L≥2 and L is a positive integer;
the two columns and L rows of touch electrodes comprise a first touch electrode column and a second touch electrode column, wherein the first touch electrode column is adjacent to the second touch electrode column; and
the touch short-circuit detection stage further comprises a second detection stage;
the detection method further comprises:
providing, at the second detection stage, the short-circuit detection signal for a touch electrode located in the first touch electrode column by a multiplex selection device corresponding to the first touch electrode column; and determining, according to a short-circuit feedback signal generated by a multiplex selection device corresponding to the second touch electrode column, whether touch electrodes located in a same row are short-circuited.

3. The detection method of claim 2, wherein the second detection circuit comprises a number M of first control lines;
each multiplex selection device comprises a number M of first switching devices; control terminals of first switching devices having a same arrangement number in different multiplex selection devices are electrically connected to a same first control line; first terminals of the number M of first switching devices in a same multiplex selection device are electrically connected, and second terminals of the number M of first switching devices in the same multiplex selection device are in one-to-one correspondence with and electrically connected to the number M of adjacent ones of the touch electrodes in the same column;
the second detection stage comprises a first detection sub-stage, . . . , an i-th detection sub-stage, . . . , and an M-th detection sub-stage, wherein 1≤i≤M and i is a positive integer;
the providing, at the second detection stage, the short-circuit detection signal for the touch electrode located in the first touch electrode column by the multiplex selection device corresponding to the first touch electrode column; and determining, according to the short-circuit feedback signal generated by the multiplex selection device corresponding to the second touch electrode column, whether the touch electrodes located in the same row are short-circuited comprises:
transmitting, at the i-th detection sub-stage, a first enable signal to a first control line in an i-th line to provide the short-circuit detection signal to the touch electrode located in the first touch electrode column by a first switching device having an arrangement number of i, and determining, according to a short-circuit feedback signal generated by a first switching device having the arrangement number of i corresponding to the second touch electrode column, whether touch electrodes in a n×i-th row are short-circuited, wherein n is 1, 2, ..., Z/M, n is a positive integer, and Z is a total number of rows of the touch electrodes of the display panel;

the providing, at the first detection stage, the short-circuit detection signal for the touch electrode in the first touch electrode row by the first detection circuit, and determining, according to the short-circuit feedback signal generated by the second detection circuit, whether adjacent ones of the touch electrodes located in the same column are short-circuited comprises:

providing, at the first detection stage, the short-circuit detection signal for a first touch electrode by the first detection circuit, and determining, according to a short-circuit feedback signal generated by a first switching device electrically connected to a second touch electrode, whether adjacent ones of the touch electrodes located in the same column are short-circuited, wherein the first touch electrode and the second touch electrode are located in a same first touch area group and in a same touch electrode column.

4. The detection method of claim 1, wherein the first detection circuit comprises a plurality of gating devices, wherein each gating device of the plurality of gating devices comprises a second input terminal, a third input terminal, and two second output terminals;

the two second output terminals of the each gating device are electrically connected to a first touch electrode and a second touch electrode, respectively, wherein the first touch electrode and the second touch electrode are located in a same first touch area group and in a same touch electrode column;

the providing, at the first detection stage, the short-circuit detection signal for the touch electrode in the first touch electrode row by the first detection circuit, and determining, according to the short-circuit feedback signal generated by the second detection circuit, whether adjacent ones of the touch electrodes located in the same column are short-circuited comprises:

providing, at the first detection stage, the short-circuit detection signal for the first touch electrode by the gating device, and determining, according to a short-circuit feedback signal generated by a multiplex selection device electrically connected to the first touch electrode, whether adjacent ones of the touch electrodes located in the same column are short-circuited;

the providing, at the first detection stage, the short-circuit detection signal for the touch electrode in the first touch electrode row by the first detection circuit, and determining, according to the short-circuit feedback signal generated by the first detection circuit, whether adjacent ones of the touch electrodes located in the same column are short-circuited comprises:

providing, at the first detection stage, the short-circuit detection signal for the second input terminal to transmit the short-circuit detection signal to the first touch electrode by the gating device, and determining, according to a short-circuit feedback signal generated by the third input terminal, whether adjacent ones of the touch electrodes located in the same column are short-circuited.

5. The detection method of claim 4, wherein the first detection circuit further comprises a second control line, a third control line, a first short-circuit signal supply line, and a second short-circuit signal supply line; and the each gating device comprises a second switching device and a third switching device, wherein a first terminal of the second switching device is electrically connected to the second short-circuit signal supply line, a second terminal of the second switching device is electrically connected to the first touch electrode, and a control terminal of the second switching device is electrically connected to the second control line; and a first terminal of the third switching device is electrically connected to the first short-circuit signal supply line, a second terminal of the third switching device is electrically connected to the second touch electrode, and a control terminal of the third switching device is electrically connected to the third control line;

the providing, at the first detection stage, the short-circuit detection signal for the first touch electrode by the gating device, and determining, according to the short-circuit feedback signal generated by the multiplex selection device electrically connected to the first touch electrode, whether adjacent ones of the touch electrodes located in the same column are short-circuited comprises:

transmitting, at the first detection stage, a second enable signal to the second control line to transmit the short-circuit detection signal transmitted from the second short-circuit signal supply line to the first touch electrode by the second switching device, and determining, according to the short-circuit feedback signal generated by the multiplex selection device electrically connected to the first touch electrode, whether adjacent ones of the touch electrodes located in the same column are short-circuited;

the providing, at the first detection stage, the short-circuit detection signal for the second input terminal to transmit the short-circuit detection signal to the first touch electrode by the gating device, and determining, according to the short-circuit feedback signal generated by the third input terminal, whether adjacent ones of the touch electrodes located in the same column are short-circuited comprises:

transmitting, at the first detection stage, a second enable signal to the second control line to transmit the short-circuit detection signal transmitted from the second short-circuit signal supply line to the first touch electrode by the second switching device; receiving, by the third control line, a third enable signal to turn on the third switching device; and determining, according to a short-circuit feedback signal generated by the first short-circuit signal supply line, whether adjacent ones of the touch electrodes located in the same column are short-circuited.

6. The detection method of claim 1, wherein the display panel further comprises a dot screen test stage;

the detection method further comprises:

providing, at the dot screen test stage, a dot screen test signal for a plurality of touch electrodes of the display panel by the first detection circuit or the second detection circuit to determine whether the display panel displays abnormally.

7. The detection method of claim 1, wherein the display panel further comprises a display stage;

the display stage comprises a display sub-stage and a touch sub-stage;

the detection method further comprises:

providing, at the display sub-stage, a common signal for a plurality of touch electrodes of the display panel by the first detection circuit and the second detection circuit separately to perform display driving on sub-pixels of the display panel; and providing, at the touch sub-stage, a touch scanning signal for the plurality of touch electrodes of the display panel by the second detection circuit in a time division manner, and determining, according to a touch detection signal fed back by the second detection circuit, a touch position.

8. The detection method of claim 1, wherein a plurality of touch electrodes of the display panel are arranged in an array, and the first detection circuit and the second detection circuit are located on two opposite sides of the touch electrodes in the array, respectively; and the first touch electrode row is located in an odd row; or the first touch electrode row is located in an even row.

9. A display panel, comprising:

a driver chip, at least one first touch area group and a plurality of touch wires; the at least one first touch area group comprises two rows and N columns of touch electrodes; and each touch wire of the plurality of touch wires is electrically connected to a respective one touch electrode of the two rows and N columns of touch electrodes; wherein N≥1, and N is a positive integer;

the display panel further comprises a first detection circuit and a second detection circuit; and each touch electrode of the two rows and N columns of touch electrodes is separately electrically connected to the first detection circuit and the second detection circuit by a respective one of the plurality of touch wires;

the two rows and N columns of touch electrodes comprise a first touch electrode row and a second touch electrode row, wherein the first touch electrode row is adjacent to the second touch electrode row;

the display panel comprises a touch short-circuit detection stage; wherein the touch short-circuit detection stage comprises a first detection stage; and the driver chip is configured to provide, at the first detection stage, the short-circuit detection signal for a touch electrode in the first touch electrode row by the first detection circuit, and determine, according to a short-circuit feedback signal generated by the second detection circuit, whether adjacent ones of the touch electrodes located in the same column are short-circuited, wherein the second detection circuit comprises a plurality of multiplex selection devices; and each multiplex selection device of the plurality of multiplex selection devices comprises a first input terminal and a number M of first output terminals, wherein M≥2 and M is a positive integer;

the number M of first output terminals of the each multiplex selection device are in one-to-one correspondence with and electrically connected to a number M of adjacent ones of the touch electrodes located in the same column by a number M of touch wires; and the driver chip is further configured to provide, at the first detection stage, the short-circuit detection signal for the touch electrode in the first touch electrode row by the first detection circuit, and determine, according to a short-circuit feedback signal generated by the first detection circuit, whether adjacent ones of the touch electrodes located in the same column are short-circuited.

10. The display panel of claim 9, wherein the display panel further comprises at least one second touch area group; and the at least one second touch area group comprises two columns and L rows of touch electrodes, wherein L≥2 and L is a positive integer;

the two columns and L rows of touch electrodes comprise a first touch electrode column and a second touch electrode column, wherein the first touch electrode column is adjacent to the second touch electrode column;

the touch short-circuit detection stage further comprises a second detection stage; and the driver chip is further configured to provide, at the second detection stage, the short-circuit detection signal for a touch electrode located in the first touch electrode column by a multiplex selection device corresponding to the first touch electrode column; and determine, according to a short-circuit feedback signal generated by a multiplex selection device corresponding to the second touch electrode column, whether the touch electrodes located in a same row are short-circuited.

11. The display panel of claim 10, wherein the second detection circuit comprises a number M of first control lines;

each multiplex selection device comprises a number M of first switching devices; control terminals of first switching devices having a same arrangement number in different multiplex selection devices are electrically connected to a same first control line; first terminals of the number M of first switching devices in a same multiplex selection device are electrically connected, and second terminals of the number M of first switching devices in the same multiplex selection device are in one-to-one correspondence with and electrically connected to the number M of adjacent ones of the touch electrodes in the same column;

the second detection stage comprises a first detection sub-stage, . . . an M-th detection sub-stage;

the driver chip is configured to transmit, at an i-th detection sub-stage, a first enable signal to a first control line in an i-th line to provide the short-circuit detection signal to the touch electrode located in the first touch electrode column by a first switching device having an arrangement number of i, and determine, according to a short-circuit feedback signal generated by the first switching device having the arrangement number of i corresponding to the second touch electrode column, whether touch electrode in a n×i-th row are short-circuited, wherein n is 1, 2, . . . , Z/M, n is a positive integer, and Z is a total number of rows of the touch electrodes of the display panel; and the driver chip is further configured to provide, at the first detection stage, the short-circuit detection signal for a first touch electrode by the first detection circuit, and determine, according to a short-circuit feedback signal generated by a first switching device electrically connected to a second touch electrode, whether adjacent ones of the touch electrodes located in the same column are short-circuited, wherein the first touch electrode and the second touch electrode are located in a same first touch area group and in a same touch electrode column.

12. The display panel of claim 9, wherein the first detection circuit comprises a plurality of gating devices, wherein each gating device of the plurality of gating devices comprises a second input terminal, a third input terminal, and two second output terminals;

the two second output terminals of the each gating device are electrically connected to a first touch electrode and a second touch electrode, respectively, wherein the first touch electrode and the second touch electrode are located in a same first touch area group and in a same touch electrode column;

the driver chip is configured to provide, at the first detection stage, the short-circuit detection signal for the first touch electrode by the gating device, and determine, according to a short-circuit feedback signal generated by a multiplex selection device electrically connected to the first touch electrode, whether adjacent ones of the touch electrodes located in the same column are short-circuited; and the driver chip is further configured to provide, at the first detection stage, the short-circuit detection signal for the second input terminal to transmit the short-circuit detection signal to the first touch electrode by the gating device, and determine, according to a short-circuit feedback signal generated by the third input terminal, whether adjacent ones of the touch electrodes located in the same column are short-circuited.

13. The display panel of claim 12, wherein the first detection circuit further comprises a second control line, a third control line, a first short-circuit signal supply line, and a second short-circuit signal supply line; and the each gating device comprises a second switching device and a third switching device, wherein a first terminal of the second switching device is electrically connected to the second short-circuit signal supply line, a second terminal of the second switching device is electrically connected to the first touch electrode, and a control terminal of the second switching device is electrically connected to the second control line; and a first terminal of the third switching device is electrically connected to the first short-circuit signal supply line, a second terminal of the third switching device is electrically connected to the second touch electrode, and a control terminal of the third switching device is electrically connected to the third control line;

the driver chip is further configured to transmit, at the first detection stage, a second enable signal to the second control line to turn on a second switching device, and transmit the short-circuit detection signal to the first touch electrode by the second short-circuit signal supply line and the second switching device sequentially, and determine, according to the short-circuit feedback signal generated by the multiplex selection device electrically connected to the first touch electrode, whether adjacent ones of the touch electrodes located in the same column are short-circuited; and the driver chip is further configured to transmit, at the first detection stage, a third enable signal to the third control line to turn on the third switching device, and determine, according to a short-circuit feedback signal generated by the first short-circuit signal supply line, whether adjacent ones of the touch electrodes located in the same column are short-circuited.

14. The display panel of claim 9, wherein the display panel further comprises a dot screen test stage; and the driver chip is configured to provide, at the dot screen test stage, a dot screen test signal for the plurality of touch electrodes of the display panel by the first detection circuit or the second detection circuit to determine whether the display panel displays abnormally.

15. The display panel of claim 9, wherein the display panel further comprises a display stage;

the display stage comprises a display sub-stage and a touch sub-stage;

the driver chip is configured to provide, at the display sub-stage, a common signal for a plurality of touch electrodes of the display panel by the first detection circuit and the second detection circuit separately to perform display driving on sub-pixels of the display panel;

the driver chip is configured to provide, at the touch sub-stage, a touch scanning signal for the plurality of touch electrodes of the display panel by the second detection circuit in a time division manner, and determine, according to a touch detection signal fed back by the second detection circuit, a touch position.

16. The display panel of claim 9, wherein the display panel comprises a liquid crystal display panel or an organic light-emitting display panel.

17. A driver chip, which is configured to execute the detection method of claim 1.

18. A display device, comprising:

a display panel, wherein the display panel comprises: a driver chip, at least one first touch area group and a plurality of touch wires; the at least one first touch area group comprises two rows and N columns of touch electrodes; and each touch wire of the plurality of touch wires is electrically connected to a respective one touch electrode of the two rows and N columns of touch electrodes; wherein N≥1, and N is a positive integer;

the display panel further comprises a first detection circuit and a second detection circuit; and each touch electrode of the two rows and N columns of touch electrodes is separately electrically connected to the first detection circuit and the second detection circuit by a respective one of the plurality of touch wires;

the two rows and N columns of touch electrodes comprise a first touch electrode row and a second touch electrode row, wherein the first touch electrode row is adjacent to the second touch electrode row;

the display panel comprises a touch short-circuit detection stage; wherein the touch short-circuit detection stage comprises a first detection stage; and the driver chip is configured to provide, at the first detection stage, the short-circuit detection signal for a touch electrode in the first touch electrode row by the first detection circuit, and determine, according to a short-circuit feedback signal generated by the second detection circuit, whether adjacent ones of the touch electrodes located in the same column are short-circuited, wherein the second detection circuit comprises a plurality of multiplex selection devices; and each multiplex selection device of the plurality of multiplex selection devices comprises a first input terminal and a number M of first output terminals, wherein M≥2 and M is a positive integer;

the number M of first output terminals of the each multiplex selection device are in one-to-one correspondence with and electrically connected to a number M of adjacent ones of the touch electrodes located in the same column by a number M of touch wires; and the driver chip is further configured to provide, at the first detection stage, the short-circuit detection signal for the touch electrode in the first touch electrode row by the first detection circuit, and determine, according to a short-circuit feedback signal generated by the first detection circuit, whether adjacent ones of the touch electrodes located in the same column are short-circuited.

* * * * *